United States Patent
Chiu et al.

(10) Patent No.: US 8,739,022 B2
(45) Date of Patent: May 27, 2014

(54) PARALLEL APPROACH TO XML PARSING

(75) Inventors: Kenneth Chiu, Vestal, NY (US); Yinfei Pan, Binghamton, NY (US)

(73) Assignee: The Research Foundation for The State University of New York, Binghamton, NY (US)

( * ) Notice: Subject to any disclaimer, the term of this patent is extended or adjusted under 35 U.S.C. 154(b) by 1611 days.

(21) Appl. No.: 12/238,351

(22) Filed: Sep. 25, 2008

(65) Prior Publication Data

US 2009/0089658 A1  Apr. 2, 2009

Related U.S. Application Data

(60) Provisional application No. 60/975,750, filed on Sep. 27, 2007.

(51) Int. Cl.
  *G06F 17/00* (2006.01)
  *G06F 17/30* (2006.01)
  *G06F 17/22* (2006.01)

(52) U.S. Cl.
  CPC ................................ *G06F 17/2247* (2013.01)
  USPC ........................................................ 715/234

(58) Field of Classification Search
  CPC .................................................. G06F 17/2247
  USPC ............ 715/234; 707/797, 791, 790; 709/243
  See application file for complete search history.

(56) References Cited

U.S. PATENT DOCUMENTS

| | | | |
|---|---|---|---|
| 5,987,468 A * | 11/1999 | Singh et al. ............................ | 1/1 |
| 7,210,097 B1 * | 4/2007 | Clarke et al. .................. | 715/227 |
| 7,251,777 B1 * | 7/2007 | Valtchev et al. .............. | 715/234 |
| 7,962,524 B2 * | 6/2011 | Okamoto et al. ............. | 707/797 |
| 2002/0091991 A1 * | 7/2002 | Castro ........................... | 717/106 |
| 2002/0111932 A1 * | 8/2002 | Roberge et al. ................... | 707/1 |
| 2003/0084078 A1 * | 5/2003 | Torii et al. ..................... | 707/513 |
| 2005/0049996 A1 * | 3/2005 | Srinivasan et al. ................ | 707/1 |
| 2005/0108428 A1 * | 5/2005 | Cornet et al. ................. | 709/243 |
| 2005/0203957 A1 * | 9/2005 | Wang et al. ................ | 707/104.1 |
| 2005/0222931 A1 * | 10/2005 | Mamou et al. .................. | 705/35 |
| 2005/0268341 A1 * | 12/2005 | Ross .............................. | 726/26 |

(Continued)

OTHER PUBLICATIONS

Parallel Approach to XML Parsing by Wei Lu et al., Presented at Grid Computing Conference Sep. 27, 2006.*

*Primary Examiner* — William Bashore
*Assistant Examiner* — Nathan Shrewsbury
(74) *Attorney, Agent, or Firm* — Steven M. Hoffberg; Ostrolenk Faber LLP

(57) ABSTRACT

A language for semi-structured documents, XML has emerged as the core of the web services architecture, and is playing crucial roles in messaging systems, databases, and document processing. However, the processing of XML documents has a reputation for poor performance, and a number of optimizations have been developed to address this performance problem from different perspectives, none of which have been entirely satisfactory. Parallel XML parsing leverages the growing prevalence of multicore architectures in all sectors of the computer market, and yields significant performance improvements. The design consists of an initial preparsing phase to determine the structure of the XML document (or other data document), followed by a full, parallel parse. The results of the preparsing phase are used to help partition the XML document for data parallel processing. The parallel parsing phase is, for example, a modification of the libxml2 XML parser, which demonstrates that the approach applies to real-world, production quality parsers. Empirical study shows the parallel XML parsing algorithm can improve the XML parsing performance significantly and scales well.

23 Claims, 22 Drawing Sheets

(56) References Cited

U.S. PATENT DOCUMENTS

| | | | |
|---|---|---|---|
| 2007/0003166 A1* | 1/2007 | Berkner | 382/298 |
| 2007/0043696 A1* | 2/2007 | Haas et al. | 707/2 |
| 2007/0113172 A1* | 5/2007 | Behrens et al. | 715/513 |
| 2007/0150809 A1* | 6/2007 | Yoshida | 715/525 |
| 2007/0219959 A1* | 9/2007 | Kanemasa | 707/3 |
| 2007/0299811 A1* | 12/2007 | Chandrasekar et al. | 707/2 |
| 2008/0270573 A1* | 10/2008 | Letz et al. | 709/218 |
| 2009/0006944 A1* | 1/2009 | Dang et al. | 715/234 |
| 2009/0052329 A1* | 2/2009 | Mahajan et al. | 370/242 |
| 2009/0094606 A1* | 4/2009 | Chen et al. | 718/100 |
| 2009/0327861 A1* | 12/2009 | Coulson et al. | 715/234 |
| 2010/0057669 A1* | 3/2010 | Gandini et al. | 707/1 |
| 2011/0016153 A1* | 1/2011 | Atta et al. | 707/797 |

* cited by examiner

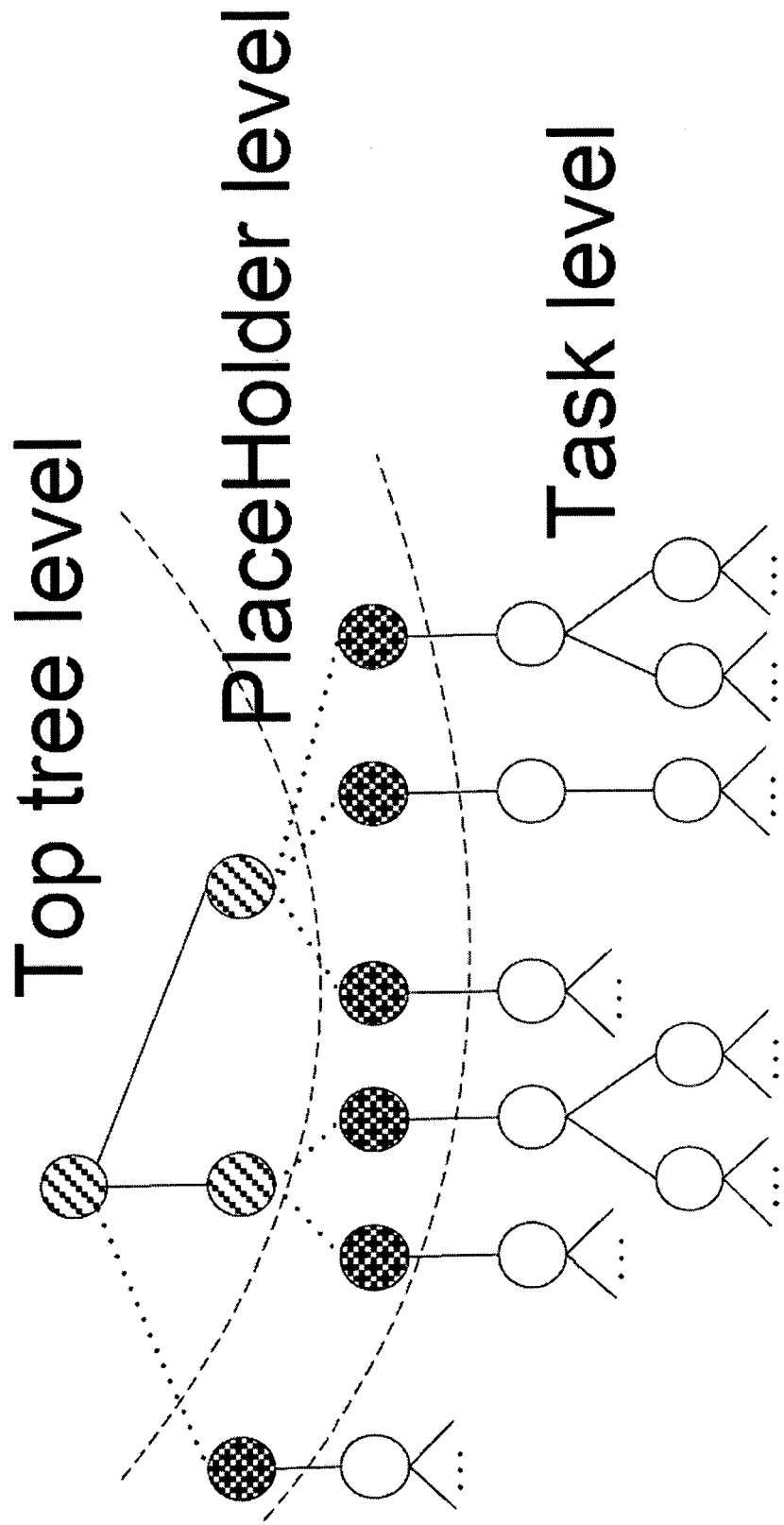

PARALLEL APPROACH TO XML PARSING

XML's emergence as the de facto standard for encoding tree-oriented, semi-structured data has brought significant interoperability and standardization benefits to grid computing. By overcoming the problems of syntactic and lexical interoperability, the acceptance of XML as the lingua franca for information exchange has freed and energized researchers to focus on the more difficult (and fundamental) issues in large-scale systems, such as semantics, autonomic behaviors, service composition, and service orchestration. The very characteristics of XML that have led to its success, however, such as its verbose and self-descriptive nature, can incur significant performance penalties.

Performance, however, is still a lingering concern for some applications of XML. A number of approaches have been used to address these performance concerns, ranging from binary XML to schema-specific parsing to hardware acceleration [14], [15]. As manufacturers have encountered difficulties to further exponential increases in clock speeds, they are increasingly utilizing the march of Moore's law to provide multiple cores on a single chip. Tomorrow's computers will have more cores rather than exponentially faster clock speeds, and software will increasingly have to rely on parallelism to take advantage of this trend [2].

With the recent advent of multicore CPUs, parallel approaches to XML parsing are attractive. Parsing XML in parallel is challenging, however, because it is difficult to divide an XML document into multiple chunks and start a core on each chunk because it is hard to start parsing in the middle of an XML document without the preceding context.

Parallel XML parsing can essentially be viewed as a particular application of the graph partitioning [6] and parallel graph search algorithms [7]. But the document parsing and DOM building introduces some new issues, such as preparsing, namespace reference, and so on, which are not addressed by those general parallel algorithms. There are a number of approaches seeking to address the performance bottleneck of XML parsing. The typical software solutions include the pull-based parsing [9], lazy parsing [10] and schema-specific parsing [11], [12], [13]. Pull-based XML parsing is driven by the user, and thus provides flexible performance by allowing the user to build only the parts of the data model that are actually needed by the application.

Schema-specific parsing leverages XML schema information, by which the specific parser (automaton) is built to accelerate the XML parsing. For the XML documents conforming to the schema, the schema-specific parsing will run very quickly, whereas for other documents the extra penalty will be paid.

Lazy parsing employs a preparsing operation to determine a structure of the XML document for the lazy evaluation, which indicates the basic tree structure of the XML document, thereafter based on the user's access requirements, the corresponding piece of the XML document will be located by looking up the skeleton and be fully parsed.

The Extensible Markup Language (XML) is a general-purpose markup language. It is classified as an extensible language because it allows its users to define their own tags. Its primary purpose is to facilitate the sharing of structured data across different information systems, particularly via the Internet. It is used both to encode documents and serialize data.

There are two levels of correctness of an XML document: (1) Well-formed. A well-formed document conforms to all of XML's syntax rules. For example, if an element has an opening tag with no closing tag and is not self-closing, it is not well-formed. A document that is not well-formed is not considered to be XML; a conforming parser is not allowed to process it. (2) Valid. A valid document additionally conforms to some semantic rules. These rules are either user-defined, or included as an XML schema or DTD. For example, if a document contains an undefined tag, then it is not valid; a validating parser is not allowed to process it.

As long as only well-formedness is required, XML is a generic framework for storing any amount of text or any data whose structure can be represented as a tree. The only indispensable syntactical requirement is that the document has exactly one root element (alternatively called the document element). This means that the text must be enclosed between a root opening tag and a corresponding closing tag. In any meaningful application, additional markup is used to structure the contents of the XML document. The text enclosed by the root tags may contain an arbitrary number of XML elements. A generic XML document contains a tree-based data structure. Attribute values must always be quoted, using single or double quotes, and each attribute name should appear only once in any element. XML requires that elements be properly nested—elements may never overlap.

XML provides special syntax for representing an element with empty content. Instead of writing a start tag followed immediately by an end tag, a document may contain an empty-element tag. An empty-element tag resembles a start tag but contains a slash just before the closing angle bracket. An empty-element tag may contain attributes. An entity in XML is a named body of data, usually text, such as an unusual character. An entity reference is a placeholder that represents that entity. It consists of the entity's name preceded by an ampersand ("&") and followed by a semicolon (";"). XML has five predeclared entities:

& & ampersand
< < less than
> > greater than
' ' apostrophe
" " quotation mark

If more entities need to be declared, this is done in the document's Document Type Definition (DTD).

A well-formed document must conform to the following rules, among others:
(1) Non-empty elements are delimited by both a start-tag and an end-tag.
(2) Empty elements may be marked with an empty-element (self-closing) tag, such as <IAmEmpty/>. This is equal to <IAmEmpty></IAmEmpty>.
(3) All attribute values are quoted with either single (') or double (") quotes. Single quotes close a single quote and double quotes close a double quote.
(4) Tags may be nested but must not overlap. Each non-root element must be completely contained in another element.
(5) The document complies with its declared character encoding. The encoding may be declared or implied externally, such as in "Content-Type" headers when a document is transported via HTTP, or internally, using explicit markup at the very beginning of the document. When no such declaration exists, a Unicode encoding is assumed, as defined by a Unicode Byte Order Mark before the document's first character. If the mark does not exist, UTF-8 encoding is assumed.

The careful choice of names for XML elements will convey the meaning of the data in the markup. This increases human readability while retaining the rigor needed for software parsing. Choosing meaningful names implies the semantics of elements and attributes to a human reader without reference to external documentation. However, this can lead to verbosity, which complicates authoring and increases file size.

It is relatively simple to verify that a document is well-formed or validated XML, because the rules of well-formedness and validation of XML are designed for portability of tools. The idea is that any tool designed to work with XML files will be able to work with XML files written in any XML language (or XML application).

By leaving the names, allowable hierarchy, and meanings of the elements and attributes open and definable by a customizable schema or DTD, XML provides a syntactic foundation for the creation of purpose specific, XML-based markup languages. The general syntax of such languages is rigid—documents must adhere to the general rules of XML, ensuring that all XML-aware software can at least read and understand the relative arrangement of information within them. The schema merely supplements the syntax rules with a set of constraints. Schemas typically restrict element and attribute names and their allowable containment hierarchies, such as only allowing an element named 'birthday' to contain 1 element named 'month' and 1 element named 'day', each of which has to contain only character data. The constraints in a schema may also include data type assignments that affect how information is processed; for example, the 'month' element's character data may be defined as being a month according to a particular schema language's conventions, perhaps meaning that it must not only be formatted a certain way, but also must not be processed as if it were some other type of data. An XML document that complies with a particular schema/DTD, in addition to being well-formed, is said to be valid. An XML schema is a description of a type of XML document, typically expressed in terms of constraints on the structure and content of documents of that type, above and beyond the basic constraints imposed by XML itself.

XML's regular structure and strict parsing rules allow software designers to leave parsing to standard tools, and since XML provides a general, data model-oriented framework for the development of application-specific languages, software designers need only concentrate on the development of rules for their data, at relatively high levels of abstraction. Well-tested tools exist to validate an XML document "against" a schema: the tool automatically verifies whether the document conforms to constraints expressed in the schema. Some of these validation tools are included in XML parsers, and some are packaged separately.

The oldest schema format for XML is the Document Type Definition (DTD), inherited from SGML. While DTD support is ubiquitous due to its inclusion in the XML 1.0 standard, it is seen as limited for the following reasons: (1) It has no support for newer features of XML, most importantly namespaces. (2) It lacks expressiveness. Certain formal aspects of an XML document cannot be captured in a DTD. (3) It uses a custom non-XML syntax, inherited from SGML, to describe the schema.

A newer XML schema language, described by the W3C as the successor of DTDs, is XML Schema, or more informally referred to by the initialism for XML Schema instances, XSD (XML Schema Definition). XSDs are far more powerful than DTDs in describing XML languages. They use a rich datatyping system, allow for more detailed constraints on an XML document's logical structure, and must be processed in a more robust validation framework. XSDs also use an XML-based format which makes it possible to use ordinary XML tools to help process them, although XSD implementations require much more than just the ability to read XML. XSD employs the XML-based syntax, which leads to verbosity in schema description, which makes XSDs harder to read and write. XSD validation can be an expensive addition to XML parsing, especially for high volume systems.

Some schema languages not only describe the structure of a particular XML format but also offer limited facilities to influence processing of individual XML files that conform to this format. DTDs and XSDs both have this ability; they can for instance provide attribute defaults.

Three traditional techniques for processing XML files are: Using a programming language and the SAX API. Using a programming language and the DOM API. Using a transformation engine and a filter. More recent and emerging techniques for processing XML files are: Pull Parsing, Data binding, and Non-extractive XML Processing API Simple API for XML (SAX) is a lexical, event-driven interface in which a document is read serially and its contents are reported as "callbacks" to various methods on a handler object of the user's design. SAX is considered fast and efficient to implement, but difficult to use for extracting information at random from the XML, since it tends to burden the application author with keeping track of what part of the document is being processed. It is better suited to situations in which certain types of information are always handled the same way, no matter where they occur in the document.

DOM is an interface-oriented API that allows for navigation of the entire document as if it were a tree of "Node" objects representing the document's contents. A DOM document can be created by a parser, or can be generated manually by users (with limitations). Data types in DOM Nodes are abstract; implementations provide their own programming language-specific bindings. DOM implementations tend to be memory intensive, as they generally require the entire document to be loaded into memory and constructed as a tree of objects before access is allowed.

A filter in the Extensible Stylesheet Language (XSL) family can transform an XML file for displaying or printing. XSL-FO is a declarative, XML-based page layout language. An XSL-FO processor can be used to convert an XSL-FO document into another non-XML format, such as PDF.

XSLT is a declarative, XML-based document transformation language. An XSLT processor can use an XSLT stylesheet as a guide for the conversion of the data tree represented by one XML document into another tree that can then be serialized as XML, HTML, plain text, or any other format supported by the processor.

XQuery is a W3C language for querying, constructing and transforming XML data. XPath is a DOM-like node tree data model and path expression language for selecting data within XML documents. XSL-FO, XSLT and XQuery all make use of XPath. XPath also includes a useful function library.

A form of XML access that has become increasingly popular in recent years is push parsing, which treats the document as if it were a series of items which are being read in sequence. This allows for writing of recursive-descent parsers in which the structure of the code performing the parsing mirrors the structure of the XML being parsed, and intermediate parsed results can be used and accessed as local variables within the methods performing the parsing, or passed down (as method parameters) into lower-level methods, or returned (as method return values) to higher-level methods. For instance, in the Java programming language, the StAX framework can be used to create what is essentially an 'iterator' which sequentially visits the various elements, attributes, and data in an XML document. Code which uses this 'iterator' can test the current item (to tell, for example, whether it is a start or end element, or text), and inspect its attributes (local name, namespace, values of XML attributes, value of text, etc.), and can also request that the iterator be moved to the 'next' item. The code can thus extract information from the document as it traverses it.

One significant advantage of push-parsing methods is that they typically are considered much more speed- and memory-efficient than SAX and DOM styles of parsing XML. Another advantage is that the recursive-descent approach tends to lend itself easily to keeping data as typed local variables in the code doing the parsing, while SAX, for instance, typically requires a parser to manually maintain intermediate data within a stack of elements which are parent elements of the element being parsed. This tends to mean that push-parsing code is often considered much more straightforward to understand and maintain than SAX parsing code. Some potential disadvantages of push parsing are that it is a newer approach which is not as well known among XML programmers (although it is by far the most common method used for writing compilers and interpreters for languages other than XML), and that most existing push parsers cannot yet perform advanced processing such as XML schema validation as they parse a document.

Another form of XML Processing API is data binding, where XML data is made available as a custom, strongly typed programming language data structure, in contrast to the interface-oriented DOM. Example data binding systems are the Java Architecture for XML Binding (JAXB) and the Strathclyde Novel Architecture for Querying XML (SNAQue).

See, Wikipedia entry for "XML", en.wikipedia.org/wiki/XML.

SUMMARY AND OBJECTS OF THE INVENTION

This invention provides systems and methods for parsing XML in parallel, for example on a shared memory computer, and has been shown to scale reasonably well to thirty cores. Concurrency may be used in a number of ways to improve XML parsing performance. One approach would be to use pipelining. In this approach, XML parsing may be divided into a number of stages. Each stage would be executed by a different thread. This approach may provide speedup, but software pipelining may be difficult in some cases to implement well, due to synchronization, load-balance and memory access costs. More promising is a data-parallel approach. Here, the XML document would be divided into some number of chunks, and each thread would work on the chunks independently. As the chunks are parsed, the results are merged.

To divide the XML document into chunks, it could simply be treated as a sequence of characters, which are then divided into equal-sized chunks, assigning one chunk to each thread. This requires that each thread begin parsing from an arbitrary point in the XML document, however, which is problematic. Since an XML document is the serialization of a tree-structured data model (called XML Infoset [3]) traversed in left-to-right, depth-first order, such a division will create chunks corresponding to arbitrary parts of the tree, and thus the parsing results will be difficult to merge back into a single tree. Correctly reconstructing namespace scopes and references may also be challenging. Furthermore, most chunks will begin in the middle of some string whose grammatical role is unknown. It could be a tag name, an attribute name, an attribute value, element content, etc. This may be resolved by extensive backtracking and communication, but that would incur overhead that may negate the advantages of parallel parsing.

However, if instead of the equal-sized physical decomposition, the XML document is decomposed based on its logical structure, a more efficient parallel XML parsing paradigm is achieved.

The results of parsing XML can vary from a DOM-style, data structure representing the XML document, to a sequence of events manifest as callbacks, as in SAX-style parsing. The present parallel approach focuses on DOM-style parsing, where a tree data structure is created in memory that represents the document. A SAX style parsing could also be applied. A preferred targeted application area is scientific computing, but this approach is broadly applicable to a variety of document types. The preferred implementation is based on the production quality libxml2 [1] parser, but other parsers may also be employed.

Current programming models for multicore architectures provide access to multiple cores via threads. Thus, the term thread is employed rather than core, though it should be understood that threads may be executed on single cores, multiple cores, or dispersed processing arrays. If multiple threads are executing on a single core, or to a lesser extent, contending for other resources, scheduling issues may also be considered.

In accordance with the present invention, an XML document is first preparsed in linear fashion, using a quick sequential scan of the XML document, generating sufficient information to allow the full parse to proceed in parallel, and then the parsing itself is performed using a plurality of threads executing in parallel. Since the preparsing operation, or at least a significant portion thereof, must be completed before the parsing itself commenced, it is generally advantageous to perform the minimum preparsing necessary in the first stage. Of course, under some circumstances, aspects of the parsing may be performed during the preparsing, and the parsing itself may commence before completion of the preparsing, perhaps with contingent acceptance of the results based on the outcome of the complete preparsing. Likewise, certain aspects of the parsing itself may be commenced before the preparsing results are available, if the parsing results are accepted or interpreted contingent on the preparsing (which in this case may be completed after the parsing). While this may be overall inefficient with respect to use of computational resources, it may yield results sooner than waiting for the preparsing to complete before the parsing can commence.

In some cases, parsing of the XML document may commence before the entire document is received, or in some cases, the preparsing and contingent parsing may be performed on a portion of the XML document which is maintained in a local cache, in order to optimize the latency due to cache reloading for multiple pass processing.

One advantage of an embodiment of the present invention is that it can be used to leverage multicore computers to parse XML in parallel. That is, in current state-of-the-art desktop computers and servers, multicore processors are employed, and are available for use; a parsing algorithm that requires single-threaded execution therefore wastes available processing capacity. Furthermore, it has the advantage over other ways of improving the performance of XML parsing in that it does not need specialized hardware, and will work in complementary fashion with other techniques for improving performance. The technique according to the present invention shows scalability to at least four cores, and practically to a very large number of cores or nodes on a processing grid, for example greater than 100 nodes.

Once the skeleton has been computed by a preparsing process, the XML document is partitioned into segments, with each segment representing one task. The goal of this stage is to find a set of tasks that can be partitioned into subsets, generally such that each subset will require the same amount of time to parse. In other words, it is preferred that the partitioning be well-balanced. Another goal is to maximize the size of each task, to reduce overhead costs. This problem is a variant of the bin packing problem. Note that these two goals are in opposition. Smaller tasks will make it easier to partition them such that all subsets take the same amount of time.

Following the work in parallel discrete optimization algorithms [16, 17, 18] and parallel depth-first search [19], two kinds of partitioning are considered: static and dynamic. Static partitioning is performed before parallel processing begins, while dynamic partitioning is performed on-the-fly as the parallel processing proceeds based on the run-time load status. Regardless of which scheme is used, the key goal of the task partitioning is to generate a set of optimally balanced workloads.

Static partitioning uses a priori knowledge to estimate the time required to execute each task. Accurate estimates can be difficult to obtain in some cases, which will lead to poor balancing. Furthermore, static partitioning is usually a sequential preprocessing step, which will limit speedup according to Amdahl's law [20].

However, the potential benefits of dynamic partitioning are not free. The intensive communication and synchronization between the threads can incur significant performance overhead. In contrast, when static partitioning is completed, all threads can run independently. Hence to achieve a good performance solution, the choice of the partitioning scheme should depend on the complexity of the problem. If the problem corresponds to a flat structure (e.g., an array), static partitioning is preferred over dynamic partitioning. However, if the problem is a highly irregular, unbalanced tree or graph structure, dynamic schemes become correspondingly more beneficial.

It is noted that the essential problem relates to the processing of hierarchical data structures or documents, in which knowledge of the hierarchy is important for understanding and processing the data. Therefore, similar data strings in different places within the document may have different interpretation, which is context sensitive. Therefore, techniques intended to parallelize processing of the data require an understanding of this hierarchy and organization, since the data cannot be definitively processed in the absence of this information. It is noted that in some cases, the ambiguity is limited, and therefore portions of the data structure can be contingently processed based on the various possibilities; however, this leads to inefficiencies based on redundant and wasteful processing. In other cases, even such contingent processing is not feasible. Therefore, a preprocessing or preparsing of the data structure is provided to define the hierarchy and interrelation of data elements within the data structure. Based on this initial step, the data structure and the tasks to be performed in its processing can be separated into discrete tasks with little or no interdependency, permitting efficient parallel processing.

A related problem, especially for large documents or data structure for which the time required for processing is an issue, is the retrieval the data from a mass storage device, which may be remote from the user or processor for the data. In other cases, the data structure is created for communication, and carried, for example, over a packet data network. In any case, such communications tend to be linear, that is, the data is communicated in order, and through a single communication path. Likewise, in some cases, the communication is not instantaneous, and the communication latency is a factor.

This architecture presents an opportunity for conducting a serial data processing task on the data structure within a component of the communication infrastructure, such as a router, rather than conducting this processing only after the entire data structure is received at a destination. Therefore, one embodiment provides that a pre-processing or pre-parsing of the data structure occurs by or in conjunction with a router or other communication device generally provided for another purpose. In this way, the pre-processing or pre-parsing latency may be minimized, since it overlaps the communications latency. It is noted that, even if this overlap does not occur, the functional consolidation may be advantageous.

Another advantage of analyzing the data within a communication-centric component is that the communications device may become data dependent. For example, in a large data structure, the actual arrangement of data in a file may not be directly corresponding to the logical structure of the data. Therefore, if the data structure is analyzed during communication, the communications device may, for example, communicate portions of a file in a different order than that of the stored file. Indeed, the logic in the communications system may interact with the source, to alter the data structure as it is being communicated. Likewise, the communications device may also respond to the data structure being communicated to interact with the destination or destinations. For example, the communications device may serve as a router which determines a destination for the communication at least partially in dependence on the types of resources required to process the data, the intended use of the data, and/or to separate data portions and forward these to different destinations based on the data structure and/or data content.

While a preferred implementation of the invention is useful for processing extensible markup language (XML) documents, the scope is not so limited. For example, a complex media or multimedia data structure may have associated metadata. In some cases, a digitally compressed media file may employ a non-streaming compression format in which a decoding of a portion of the media requires data which is not contemporaneously transmitted. Likewise, the metadata may itself not represent codes in a linear time-stream time-synchronized with the media stream or file, and therefore a relation of the metadata with corresponding data may be at a logical and not time-synchronized level. In these cases, a user's interaction with the media based on the metadata may be made more efficient by parsing the metadata to determine its relation to the data. Since a use of the media data often commences prior to receipt of the entire media data file, it may be convenient to process the metadata and associated media data remote from the user, to permit a non-linear or interactive use of the media data. Thus, the present technology holds application in media data distribution infrastructure, and indeed in other communications systems presenting similar considerations.

BRIEF DESCRIPTION OF THE DRAWINGS

FIGS. 9A, 9B and 9C shows the logical structure of the top tree, tasks' placeholder, and tasks. FIG. 9A shows the complete tree. FIG. 9B shows the top tree and the subtree tasks. FIG. 9C additionally shows the placeholder level.

DETAILED DESCRIPTION OF THE PREFERRED EMBODIMENTS

Any kind of parsing is based on some kind of machine abstraction. The problems of an arbitrary division scheme arise from a lack of information about the state of the parsing machine at the beginning of each chunk. Without this state, the machine does not know how to start parsing the chunk. Unfortunately, the full state of the parser after the Nth character cannot be provided without first considering each of the preceding N−1 characters.

This thus leads us to the Parallel XML Parsing (PXP) approach provided herein. First, an initial pass is used to determine the logical tree structure of an XML document. This structure is then used to divide the XML document such the divisions between the chunks occur at well-defined points in the XML grammar. This provides enough context so that each chunk can be parsed starting from an unambiguous state.

This seems counterproductive at first glance, since the primary purpose of XML parsing is to build a tree-structured data model (i.e., XML Infoset) from the XML document. However the tree structure needed to guide the parallel parsing can be significantly smaller and simpler than that ultimately generated by a normal XML parser, and does not need to include all the information in the XML Infoset data model. This simple tree structure, specifically designed for XML data decomposition, is called the "skeleton" of the XML document.

Figure 1:
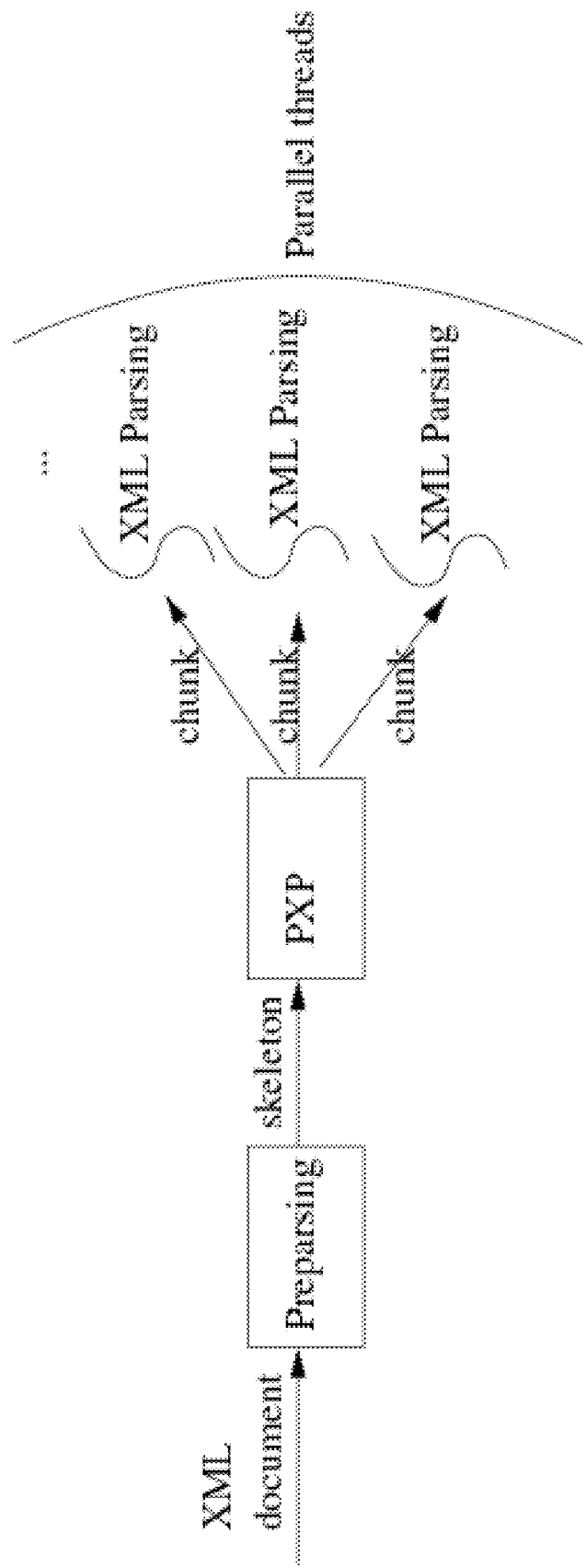
FIG. 1 shows a parallel XML parser architecture which first uses a preparser to generate a skeleton of the XML document, which is then used to guide the partitioning of the document into chunks, which are then parsed in parallel.

To distinguish from the actual XML parsing, the procedure to parse and generate the skeleton from the XML document is called "preparsing". Once the preparsing is complete and the logical tree structure of the XML document known, the document can be divided into chunks, which are preferably balanced with respect to anticipated parsing duration, and then launch multiple threads to parse the chunks in parallel. Consequently, this parallelism can significantly improve performance. This architecture is schematically shown in FIG. 1.

For simplicity and performance, PXP currently maps the entire document into memory with the mmap( ) system call. Nothing precludes this general approach from working on streamed documents, or documents too large to fit into memory, but the design and implementation may be significantly more complex.

The goal of preparsing is to determine the tree structure of the XML document so that it can be used to guide the data-parallel, full parsing. Conceptually the XML Infoset represents the tree structure of the XML document. However since only internal nodes (i.e., the element item) determine the topology of the tree, which is meaningful for XML data decomposition, those leaf nodes in the XML Infoset, such as attribute information items, comment information items, and even character information items, can be ignored by the skeleton. Further the element tag names are also ignored by the skeleton since they don't affect the topology of the tree at all.

Figure 2A:
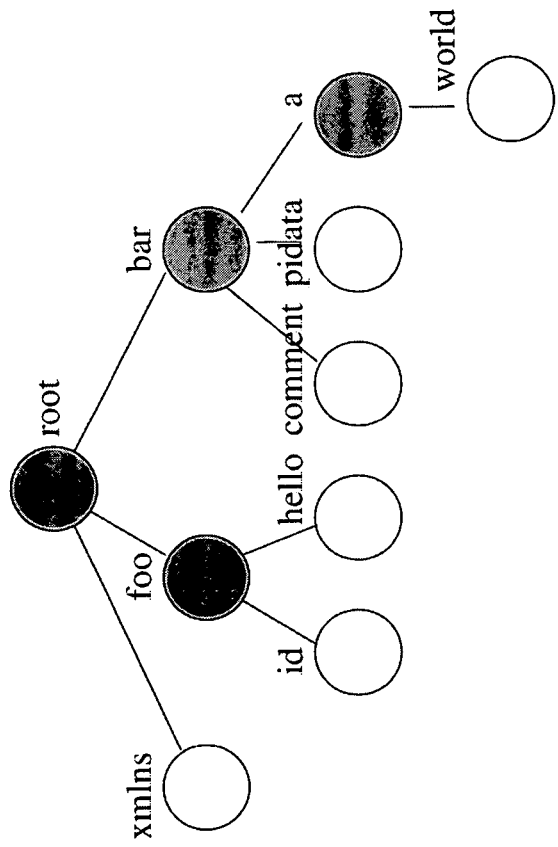
FIGS. 2A and 2B show the XML Infoset model of a simple XML document, and the skeleton of the same document, respectively.
Figure 2B:
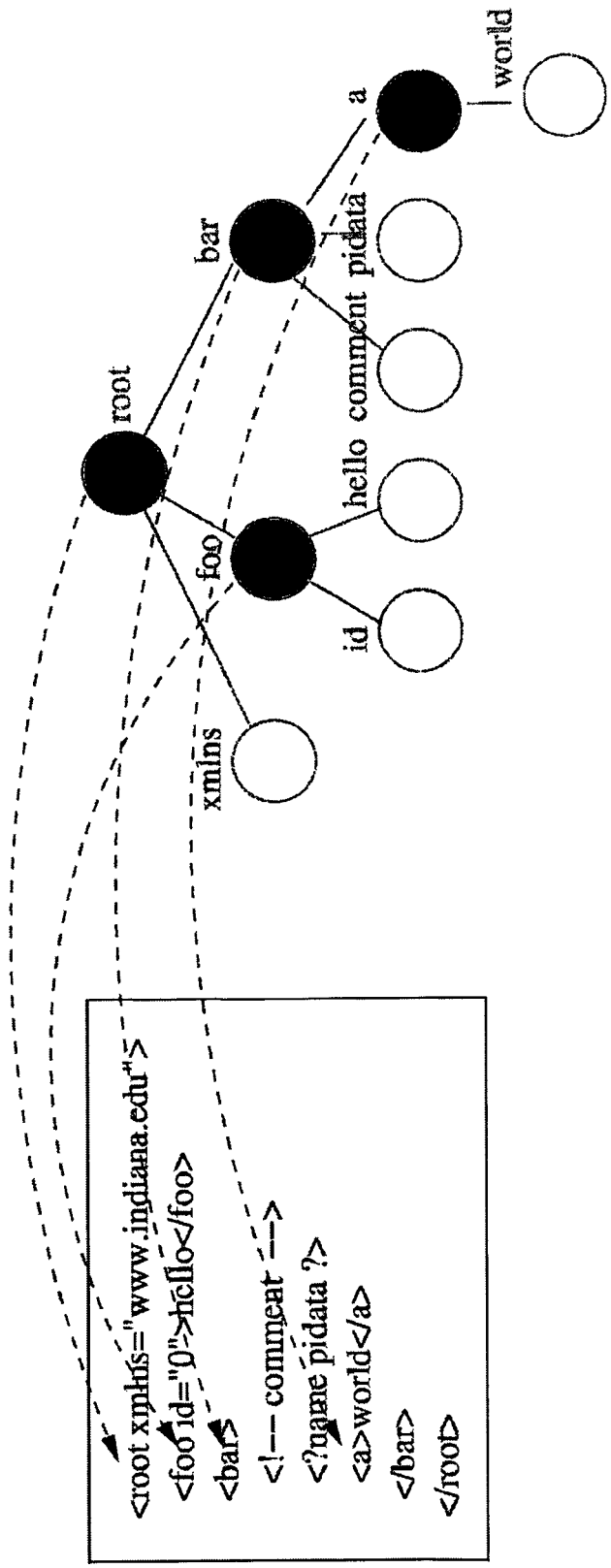

As shown in the FIG. 2, the skeleton essentially is a tree of unnamed nodes, isomorphic to the original XML document, and constructed from all starttag/end-tag pairs. To facilitate the XML data decomposition, the skeleton records the location of the start tag and end tag of each element, the parent-child relationships, and the number of children of every element.

Well-formed XML is not a regular language [4], and it cannot be parsed by a finite-state automaton, but rather requires at least a push-down automaton. So even determining the fundamental structure of the XML document, just for preparsing, requires executing a push-down automaton. However since preparsing is an additional processing step for parallel parsing, it is an additional overhead not normally incurred during XML parsing. Furthermore, since it is sequential, it fundamentally limits the parallel parsing performance. However, it has been shown that in various test cases, the preparsing operation can build the skeleton at minimal cost, i.e., short latency.

According to the XML specification [5] a non-validating XML parser must determine whether or not a XML document is well-formed. A XML document is considered well-formed if it satisfies both requirements below. For simplicity, DTD and validating XML parsing may be omitted from a prototype system and method in accordance with the present invention. Further, DTD is being replaced by the XML Schema validation, which is usually a separate process after the XML parsing:

1) It conforms to the syntax production rules defined in the XML specification.

2) It meets all the well-formedness constraints given in the specification.

However, since preparsing will be followed by a full-fledged XML parsing stage, the preparsing itself can ignore many errors. That is, for a well-formed XML document, the preparser must generate the correct result, but for an ill-formed XML document, the preparser does not need to detect any errors. Thus, the preparser only detects weak conformance to the XML specification, and hence is simpler to implement and optimize than a fully validating preparser.

As the skeleton only contains the location of the element nodes in the XML document, preparsing only needs to consider the element tag pairs, and can ignore other syntactic units and production rules for such as comments, character data, and attributes. Consequently, the preparsing has a much simpler set of production rules compared to standard XML. For example the production rule of the start tag in XML 1.0 is defined as:

```
STag        ::= '<' Name (S Attribute)* S? '>'
Attribute   ::= Name Eq AttValue
Name        ::= (Letter | '_' | ':') (NameChar)*
AttValue    ::= '"' ([^<&"] | Reference)* '"'
              | "'" ([^<&'] | Reference)* "'"
```

Because preparsing can ignore Attribute and AttValue, and even the entire Name production rule, the syntax could seemingly be simplified to just:

```
STag        ::= '<' ([^>])* '>'
```

However the above simplified production rule is incorrect due to ambiguity, because AttValue allows the > character by its production rule, which, if it appears, will cause the preparser to misidentify the location of the actual right angle bracket of the tag. Therefore, the correct rules are:

```
STag        ::= '<'([^"'])* AttValue* '>'
AttValue    ::= '"' ([^'"])* '"'
              | "'" ([^'"])* "'"
```

With same concern of possible ambiguity, the PI, Comment, and CDATA elements should be preserved in the preparsing production rules set because they are allowed to contained any string, including the < character, which would otherwise cause the preparser to misidentify the location of the end tag. The rest of production rules of standard XML are ignored by the preparsing.

Figure 3:
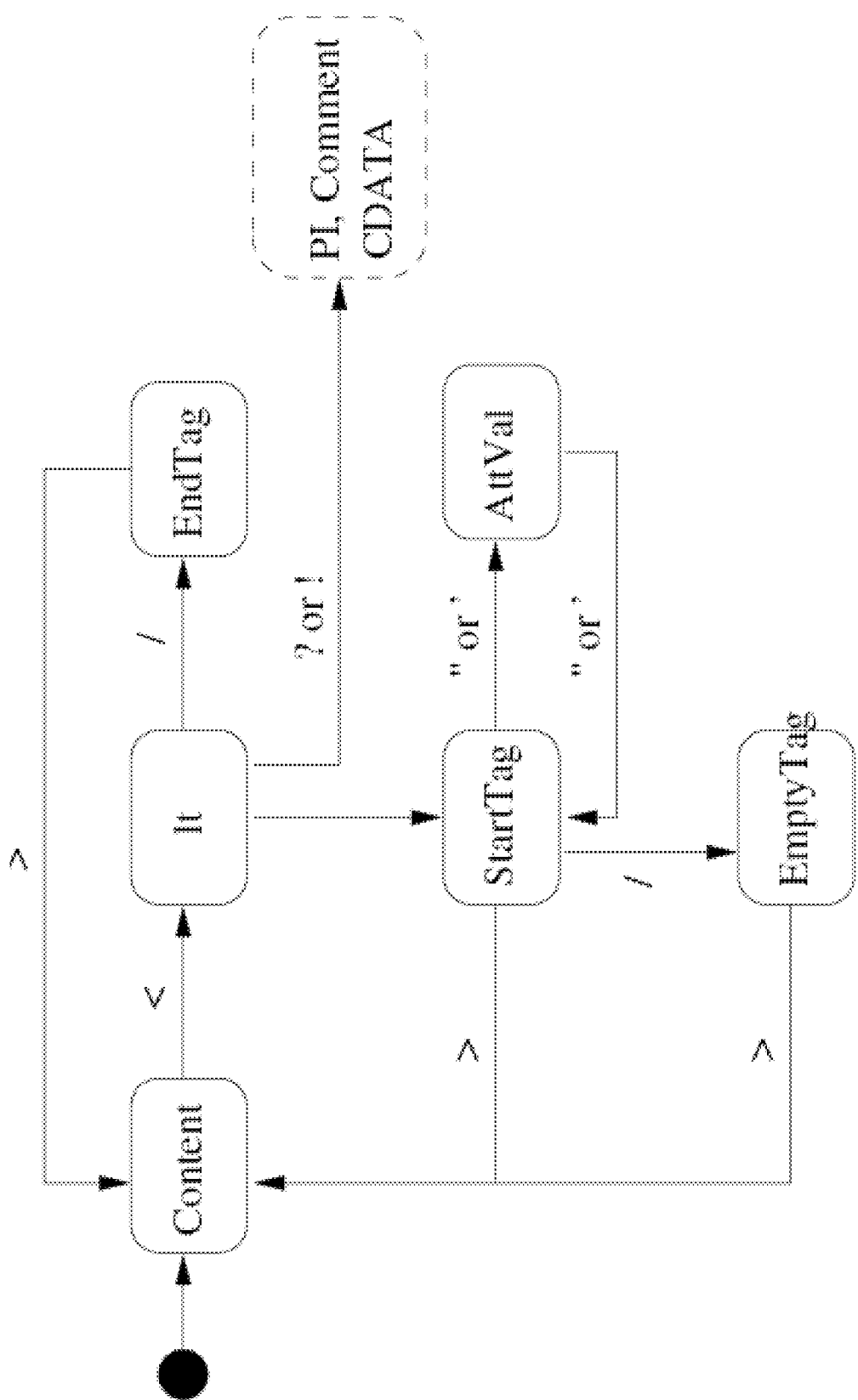
FIG. 3 shows an automaton which accepts the syntax needed by preparsing.

The simplified preparsing syntax results in a much simpler parsing automaton (FIG. 3), which only requires six major states, than the one needed by complete XML parsing. Predictably, the preparsing automaton runs much faster than the general XML parsing automaton.

In addition to the simplified syntax preparsing also benefits from omitting other well-formedness constraints. Usually in order to check the well-formedness constraints, a general XML parser will perform a number of additional comparisons, transformations, sorting, and buffering, all of which can result in significant performance bottlenecks. For instance, the fundamental well-formedness constraint is that the name in the end-tag of an element must match the name in the starttag. To check this constraint, the general XML parser might push the start tag name onto a stack whenever a start tag is encountered, and pop the stack to match the name of the end tag. The preparser, however, treats the XML document as a sequence of unnamed open and close tag pairs. Therefore, it can merely increment the top pointer of the stack for any start tag, and decrement for any end tag. Finally, if the top pointer points to the bottom of the stack, the preparser considers the XML document to be correct without an expensive string comparison.

Another well-formedness constraint example is that the attribute name must not appear more than once in the same start-tag. To verify that, a full XML parser must perform an expensive uniqueness test, which is not required for preparsing. Finally, preparsing obviously does not need to resolve namespace prefixes, since it completely ignores the tag name. However, a full XML parser supporting namespaces, requires expensive lookup operations to resolve namespace prefixes. The only constraint the preparsing requires is that the open tag has to be paired with a close tag. A simple stack is adopted for this checking, and the skeleton nodes are generated as the result of pushing and popping of the stack.

Another important source of performance advantages of preparsing compared to full parsing is that the skeleton is much lighter-weight than the DOM structure. Thus, preparsing is able to generate the skeleton substantially faster than full XML parsing is able to generate the DOM. When compared to SAX, the preparser benefits from avoiding callbacks.

During the parallel parsing phase, the structural information in the skeleton is used to divide the document into chunks, each of which contains a forest of subtrees of the XML document. Each chunk is parsed by a thread. For any parallel data technique to be effective, load-balancing must be used to prevent idle threads. Ideally, the document may be divided into chunks such that there is one chunk for each thread and such that each chunk takes exactly the same amount of time to parse. Depend on when and how the partitioning is performed, two strategies are available: static partitioning and dynamic partitioning.

In a static partitioning scheme, a tree can be statically partitioned into several equally-sized subparts by using a graph partitioning tool (e.g., Metis [6]), which can divide the graph/tree into N equally sized parts. The advantage of static partitioning is it can generate a very well-balanced load for every thread, thus leading to good parallelism.

However since the static partitioning occurs before the actual XML parsing, it knows little about the parsing context (e.g., namespace declarations). In other words, cuts made by the static partitioning will create following problems:

1) The characters of the XML document corresponding to the subgraph may no longer be contiguous. Metis will create connected subgraphs, but a connected subgraph of the logical tree structure does not necessarily correspond to a contiguous sequence of characters in the XML document. In order to parse the resulting characters, either a contiguous sequence is reconstructed by memory copying, or the XML parser modified to handle non-contiguous character sequences.

2) The namespace scope may be split between subgraphs, which means a namespace prefix may be used in one subgraph, but defined in another. These inter-chunk references will create strong memory and synchronization dependencies between threads, which will degrade performance.

The static partitioning algorithm must be executed sequentially before the parallel parsing, thus the performance gained by the parallelism may be offset by the cost of the static partitioning algorithm, which usually is not trivial.

However for XML documents representing an array structure, such as

```
<data>
    <item>....</item>
    ...
    <item>....</item>
</data>
``` which are responsible for the bulk of most large XML documents, static partitioning is able to provide good parallelism.

That is because a linear array can easily be divided into equal sized ranges (i.e., subgraphs) without an expensive graph partitioning step. The division is based on the left to right order, so every range is contiguous in the XML document.

The static PXP algorithm has been developed, which is a simple static partitioning and parallel parsing algorithm capable of parsing XML document with array structures. This serves to provide a baseline for comparison of more complex techniques. Conveniently, a function from libxml2 [1] may be leveraged, which is a widely-used and efficient XML parsing library written in C, to perform the parsing.

```
xmlParseInNodeContext(xmlNodePtr node,
    const char * data,
    int datalen,
    int options,
    xmlNodePtr * 1st)
```

This function can parse a "well-balanced chunk" of an XML document within the context (DTD, namespaces, etc.) of the given node. A well-balanced chunk is defined as any valid content allowed by the XML grammar. Since the regions generated by the static partitioning are well-balanced, the above function may be used to parse each chunk. Any element range generated by static array partitioning is a well balanced chunk. Then the static PXP algorithm consists of the following steps:

1) Construct a faked XML document in memory containing just an empty root element by copying the open/close tag pair of the root element from the original XML document, Since the size of the root element is assumed to be much smaller than the whole document, the cost of any memory operations used by this step are acceptable.
2) Call the libxml2 function xmlParseMemory( ) to parse the faked XML document, thus obtaining the root XML node. This node contains the namespace declarations required by its children, and will be treated as the context for the following parse of the ranges of the array.
3) The number of elements in each chunk is calculated by simply dividing the total number of elements in the array, which was calculated during the preparsing stage, by the number of available threads, so that every thread has a balanced work load. The start positions and data length of the chunk can be inferred from the location information of its first element and the last element.
4) Create a thread to parse each chunk in parallel. Each thread invokes xmlParseInNodeContext( ) to parse and build the DOM structure.
5) Finally the parsed results of each thread will be spliced back under the root node.

In summary, the static partitioning strategy is somewhat impractical for XML documents with irregular tree structures, due to strong dependencies between the different processing steps. However for those XML documents containing an array, it provides an upper bound on the performance gain of parallel parsing, and is useful for evaluation of other parallel parsing approaches as the guideline.

A graph can be statically partitioned into a set of subgraphs using a number of different techniques [21]. A natural partitioning for XML is as a set of subtrees. The set of connected nodes above the subtrees is called the top tree, as shown in FIG. 3(b).

Each subtree is considered a task. A preferred static partitioning algorithm maintains a list of these tasks. At each iteration, the largest task is removed from the list, and the root of the corresponding subtree is moved to the top tree. Each child of the subtree then forms a new subtree, and is placed onto the list as a new task.

Using the skeleton, the static partitioning scheme generates the set of subtrees starting from the root. The root node is first parsed, and the top tree initialized with it. All the immediate subtrees are then added below the root to the task list. The process then proceeds recursively as follows. At every iteration, the largest task is removed from the list, parse the root of the corresponding subtree and move it to the top tree. The generated subtrees which were under this node are then added back to the task list. A priority queue is used to efficiently maintain the largest task in the list. The effect is to grow the top tree down as subtasks are recursively created and new DOM nodes added to the bottom of the top tree.

Note that the top tree consists of actual DOM nodes, while the skeleton is the abbreviated structure in a concise form.

When a DOM node is added to the bottom of the top tree, the child nodes have not yet been created, but are merely "logical" nodes, which exist only in so far as they are in the skeleton. However, the DOM nodes in the top tree need to be created by parsing the corresponding XML with a full parser, which creates a problem. Because XML includes all descendants of a node within the lexical range of the node, as defined by the start- and end-tags, a parser cannot be used directly on the original text to generate a single, childless DOM node. Parsing the original text would also generate all the children nodes, leaving no work to be done during the actual parallel parsing stage.

As a workaround to this lexical problem, a duplicate is created, but childless element in a temporary string buffer, and parse this duplicate element to generate a childless DOM node. The duplicate element is created simply by concatenating the start- and end-tags of the original element, and omitting all of the content. For example, if the original element were <a><c1>...</c1><c2/></a>, then the temporary buffer would contain <a></a>. This procedure could be expensive if the top tree is large, but in practice it has been found that most large documents are relatively shallow, and thus the top tree is small compared to the total size.

The "size" of a task should correspond to how much time it will take to complete. For example, the number of characters in the corresponding XML chunk may be used an estimate of the processing time. It has been found so far that this works well, but a more sophisticated measure may be needed for some documents.

To prevent too many small subtree tasks from being generated, and thus increasing overhead, recursion is terminated when the number of tasks is greater than a preset limit, for example, 100. When such a limit is reached, there will usually be enough tasks such that they can be assigned to threads in a well-balanced manner.

As new subtasks are recursively created, and the top tree grows down, new DOM nodes are repeatedly added to the top tree. Below any node in the top tree, the left-to-right ordering of its children will correspond to the order in which they were added to that node. In a straightforward, but incorrect, implementation, this order would correspond to the order that the corresponding subtrees were removed from the task list, which would not correspond to the actual left-to-right ordering of the elements in the XML document.

Thus, to preserve the left-to-right ordering, placeholder children are created between the bottom of the top tree and the subtrees below it. These placeholders are added to the parent node immediately when it is added to the top tree, and thus the left-to-right ordering is known and can be preserved at that time. Each new subtree task is created with a pointer to its corresponding placeholder. These placeholders are removed as the top tree grows down, so that only the leaves of the top tree have placeholders. Even these are removed after the parallel parsing is complete, as described below. The entire process is diagrammed in FIG. 5.

The placeholder nodes also serve to isolate concurrent operations from one another. Once subtree partitioning is complete, each subtree task will be executed by a separate thread. These threads will complete at different times, however, so if a thread directly adds the root of a subtree to the parent node, this will result in different left-to-right orderings depending on the completion order. The placeholder nodes avoid this problem because libxml2 can be used to directly replace the placeholder nodes with the actual subtree root nodes, in place, as shown in FIG. 4. After finalization of the task partitioning, a logical three level structure connecting top tree, placeholders, and tasks together is provided as shown in FIG. 3(c). The nodes in the top tree are fully constructed, permanent DOM nodes; the nodes in the placeholder level are temporary DOM nodes used to connect the tasks to the proper left-right position within the permanent DOM nodes; and the nodes below this are logical nodes that currently only exist in the skeleton.

XML documents consist of one or more long sequences of child elements. The sequences may have similar, or even identical types of elements. These are called sequences arrays. The subtree-based task partitioning scheme is not suitable for arrays, which may contain a large number of child nodes. Adding all of these to the task list would be prohibitively inefficient. Therefore, a simple heuristic may be used to recognize arrays in the skeleton, and handle them differently, which also improves load balancing.

The heuristic treats a node as an array if the number of children is greater than some limit. During the traversal, the number of children is checked to determine if it is greater than this limit. If so, the children are treated as an array. The limit may, for example, be based on the number of threads, and is preferably set to 20 times the number of threads.

Once the current node is identified as an array, its elements are divided into equal-sized, continuous ranges. The size is chosen such that the number of ranges in the array is equal to the number of threads. Each range is treated as a task.

This differs from the subtree tasks, in that each task is now a forest rather than a subtree. These tasks are added to a FIFO queue as they are generated, which is used during task assignment as described below.

For subtree tasks, one node is created as the placeholder for the entire subtree. When the task finishes, the placeholder is simply replaced with the actual DOM node. For array tasks, a separate placeholder must be created for each range. This is because otherwise, each thread would attempt to add the child nodes in its range concurrently to the parent node, resulting in race conditions. Thus, a range placeholder is created for each array task, to isolate the concurrent operations of each thread from one another.

When a thread finishes a subtree task, it can immediately replace the placeholder node with the actual root node of the subtree. When a thread finishes an array task, however, the result is a forest of subtrees that must be added to the actual array element, which is in the position of the parent of the range placeholder (one level higher), rather than in the position of the range placeholder itself. This operation cannot occur in parallel, because otherwise multiple threads would attempt to add child nodes at the same time.

Thus, an additional table is maintained for each array to record the proper ordering for the child range placeholders, and traverse this array sequentially after the end of the parallel parsing stage.

Figure 12A:
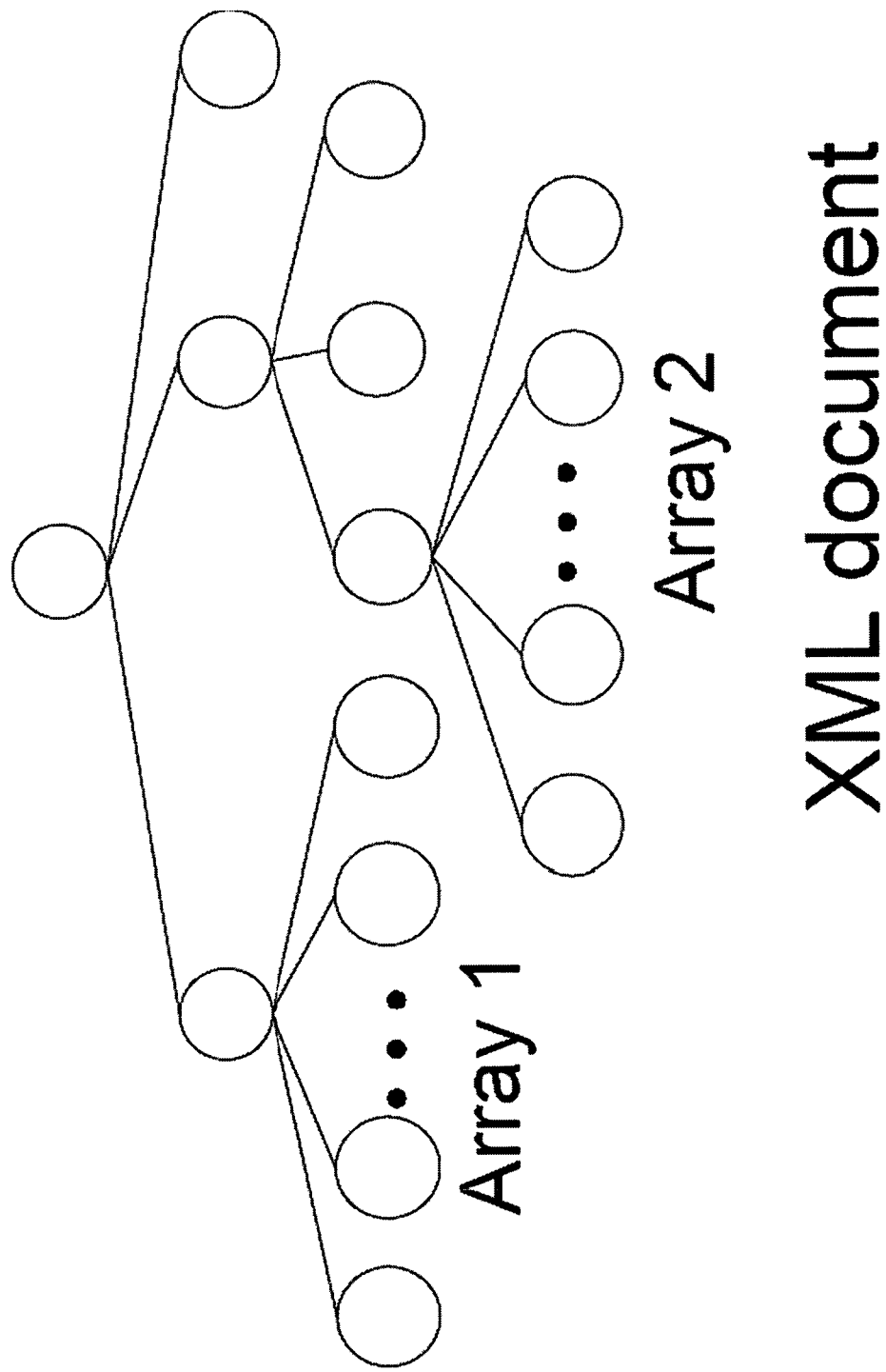
FIG. 12A shows the original tree structure.
Figure 12B:
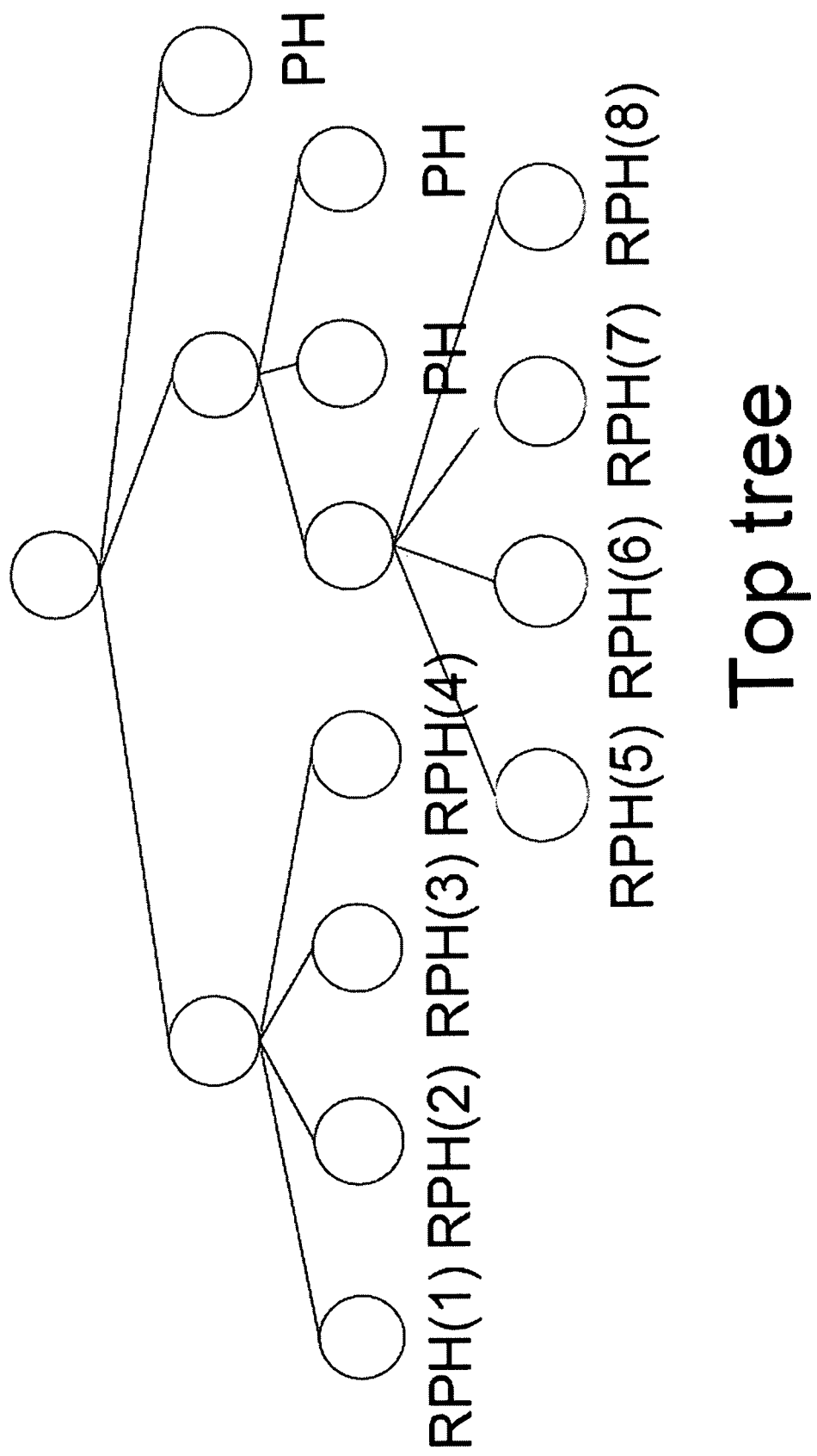
FIG. 12B shows range placeholders have been added to the tree structure of FIG. 13A
Figure 12C:
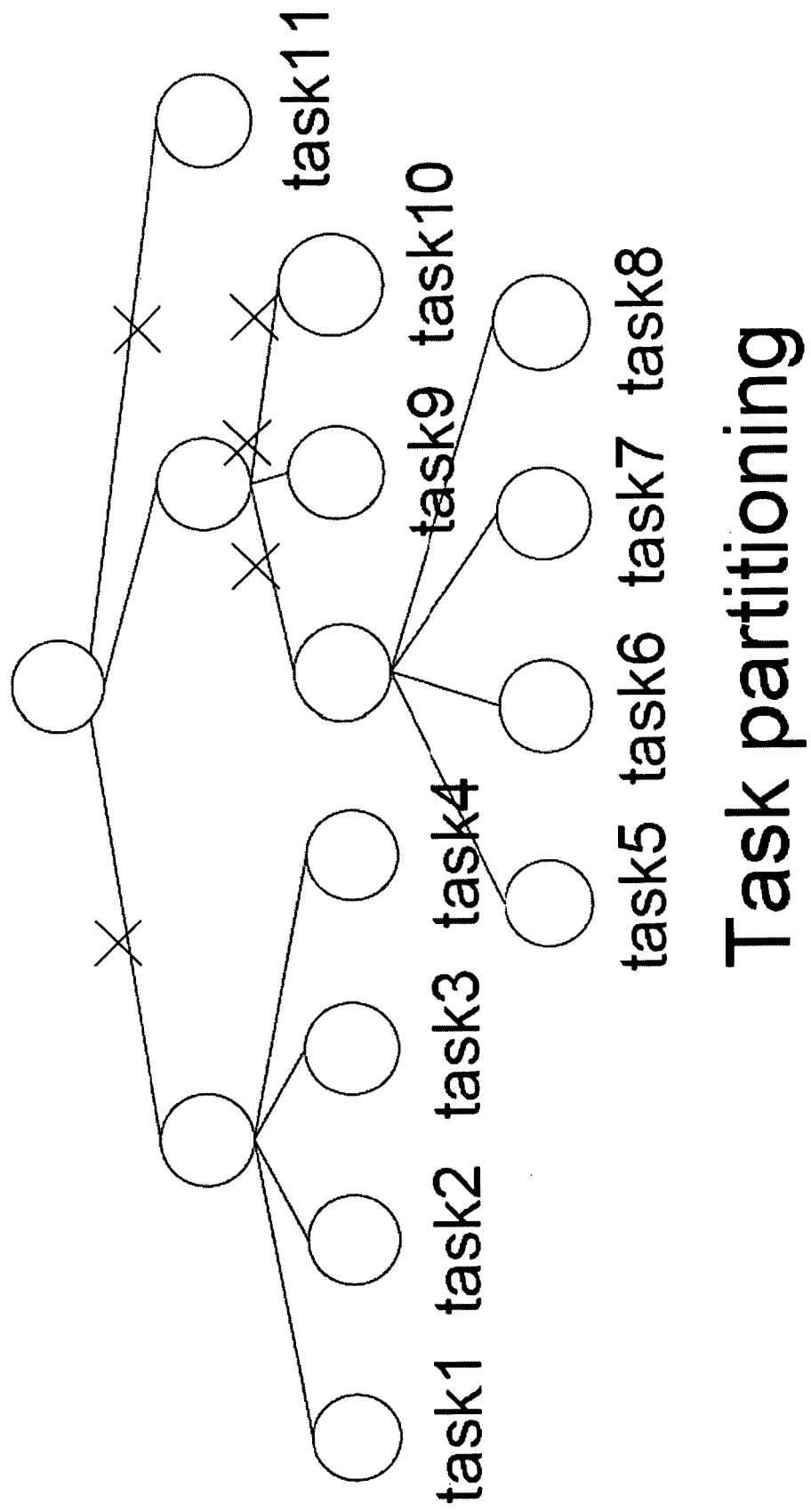
FIG. 12C shows how each range corresponds to a task.

FIG. 12A shows an XML document with two large arrays, its top tree with placeholders and task partitioning are shown in FIGS. 12B and 12C. RPH means range placeholder, PH means a subtree task placeholder.

Once the XML document has been partitioned into tasks, the tasks must be assigned to threads in a balanced manner, which is the goal of the task assignment stage. There are two sets of tasks, the subtree tasks and the array tasks.

First, the array tasks in the FIFO queue are assigned to threads in a round-robin fashion. This is because for most large XML documents the arrays are the largest part and also the most easily balanced part. As the tasks are assigned, the current workload of each thread is tracked. Because the range sizes are carefully chosen, each thread will be guaranteed to have exactly one array task per array. Also, the FIFO queue will maintain the order of the ranges on each array, which will be used in the post-processing stage.

After the array tasks have been assigned, the subtree tasks are then assigned to the threads. Each subtree task is assigned to the thread that currently has the least workload. Note that each thread's task set is maintained by using a private queue. This eliminates contention during the actual parsing phase.

In contrast with static partitioning, the dynamic partitioning strategy partitions the XML document and generates the subtasks during the actual XML parsing. After the preparser generates the skeleton, the tree structure is traversed in parallel to complete the parsing. Whenever a node is visited by a thread, its corresponding serialization (start tag) will be parsed and the related DOM node will be built.

The parallel tree traversal is equivalent to a complete, parallel depth-first search (DFS) (in which the desired node is not found), which partitions the tree dynamically and searches for a specific goal in parallel using multiple threads.

After Rao [7], dynamic partitioning consists of two phases: Task partitioning; and Subtask distribution.

Task partitioning refers to how a thread splits its current task into subtasks when another thread needs work. A common strategy is node splitting [8], in which each of the n nodes spawned by a node in a tree are themselves given away as individual subtasks. However, for parallel XML parsing, node splitting may generate too many small tasks, since most of nodes represents a single leaf element in the XML document, thus increasing the communications cost.

Figures 4A, 4B:
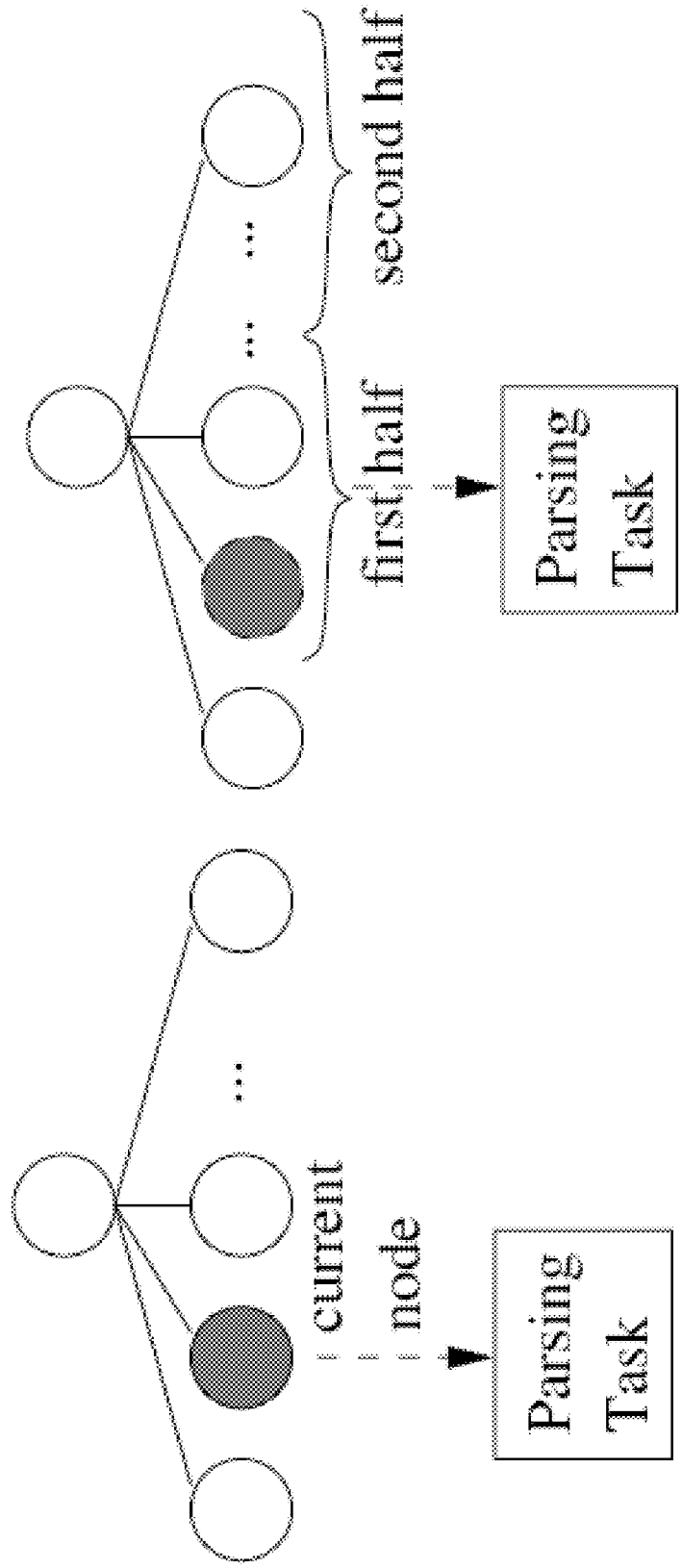
FIGS. 4A and 4B illustrate a split-in-half node splitting strategy, in which each node becomes a subtask, and the nodes of the current parsing task are split in half, with the first half given to the requesting task, while the current task finishes the second half.

Since XML is a depth-first, left-to-right serialization of a tree, a sequence of sibling element nodes in the skeleton corresponds to a contiguous chunk of the XML document. Therefore, if each parsing task covers a sequence of sibling element nodes, this will maximize the size of each workload, with little communication cost. In dynamic partitioning, a simple but effective policy of splitting the workload in half is adopted, as shown in FIGS. 4A and 4B. That is, the running thread splits the unparsed siblings of the current element node into two halves in the left-to-right order, whenever the partitioning is requested.

Subtask distribution refers to how and when subtasks are distributed for the donator thread to the requester thread. If work splitting is performed only when an idle processor requests for work, it is called requester initiated subtask distribution. In contrast if the generation of subtasks is independent of the work requests from idle processors, the scheme is referred to as a donator initiated subtask distribution scheme. For parallel XML parsing, it is preferred that the parsing thread will parse as much XML data as possible without any interruption, unless other threads are idle and asking for tasks, so as to achieve a better performance. Also, any thread can be the donator or the requester. The requester initiated subtask distribution is a preferred partition strategy in the PXP.

To implement parallel parsing with dynamic partitioning, libxml2 is employed. Since dynamic partitioning requires the parser do the task partitioning and subtask generation during the parsing, however, the libxml2 xmlParseInNodeContext( ) function cannot simply be applied as in the static partitioning scheme. Instead, the xmlParseInNodeContext( ) source code must be changed to integrate the dynamic partitioning and generation logic into the original parsing code. The actual modified function is xmlParseContent( ), which is invoked by xmlParseInNodeContext( ) to parse the XML content. The modified algorithm is called "dynamic PXP" and its basic steps are:

1) Create multiple threads, and assign the root node of skeleton as the initial parsing task to the first thread. Other threads are idle.
2) When a thread is idle, it posts its request on a request queue, and waits for the request to be filled by some donator thread.
3) Every thread, once it begins parsing, parses normally as libxml2 does, except when an open tag is being parsed.

At that time, it checks the request queue for threads that need work. If such a requester thread exists, the thread splits the current workload (i.e., the unparsed sibling nodes) into two regions. The first half is donated to the requester thread, and the thread resumes parsing at the beginning location of the second half region. Since every skeleton node records the number of its children elements, as well as its location information, it is easy to figure out the begin location and data length of the subtask. Also to avoid excessively small tasks, the user can set a threshold to prevent task partitioning if the remaining work is less than the threshold.

4) Once the requester thread obtains the parsing task, it begins the parsing at the beginning location of the donated subtask. Due to the dynamic nature, the donator is able to pass its current parsing context (e.g., the namespace declarations) to the requester as the requester's initial parsing context, which will in turn make a clone of the parsing context for itself before parsing to avoid the synchronization cost. Also the donator will create a dummy node as the "placeholder" for the parsing task, and the subtrees generated by the requester will be inserted under the placeholder, and once the parsing task is completed, the placeholder will be spliced within the entire DOM tree.
5) This process continues until all threads are idle.

In summary, dynamic partitioning load-balances during the parsing, and it can be applied to any irregular tree structure without the need of the extra partitioning algorithm. However, the dynamic nature incurs a synchronization and communication cost among the threads, which is not needed by the static partitioning scheme.

Example 1

Experiments were performed to measure the performance of the preparsing, and then experiments were performed to measure the performance improvement and the scalability of the parallel XML parsing (static and dynamic partition) algorithm over the different XML documents.

The experiments were executed on general purpose computer which has two 2 dual-core AMD Opteron processors and 4 GB of RAM, running a Linux 2.6.9 operating system. Every test was run five times to get the average time and the measurement of the first time is discarded, so as to measure performance with the file data already cached, rather than being read from disk. The programs are compiled by g++ 3.4.5 with the option -O3. The libxml2 library employed is version 2.6.16.

During initial experiments, poor speedup was observed during a number of tests that presumably should have performed well. The was attributed to lock contention in malloc( ). To avoid this, a simple, thread-optimized allocator was written and deployed around malloc( ). This allocator maintains a separate pool of memory for each thread. Thus, as long as the allocation request can be satisfied from this pool, no locks need to be acquired. To fill the pool initially, the test is run once, then all memory is freed, returning it to each pool.

The allocator is intended simply to avoid lock contention. A production allocator would use other techniques to reduce lock contention. One possibility is to simply use a two-stage technique, where large chunks of memory are obtained from a global pool, and then managed individually for each thread in a thread-local pool.

Preparsing generates the skeleton which is necessary for PXP. However, this is an additional step compared to normal XML parsing, which needs to be performed sequentially before the actual parallel parsing. Thus, to help determine whether or not this cost is acceptable, and understand the overall PXP performance, preparsing time was measured and compared to full libxml2 parsing. Since preparsing linearly traverses the XML document without backtracking or other bookkeeping, the time complexity is linear in the size of the document, and independent of the structural complexity of the document. The preparsing test was designed to maximize the performance of a full sequential parser, and used a simple array of elements which varied in size. The test document is shown in the Appendix. First, elements in the array were varied to increase document size. Then for the comparison, the costs of two widely-used parsing methods were measured: building DOM with libxml2, and parsing with the SAX implementation in libxml2. In addition, for the libxml2 SAX implementation, empty callback routines were used. Thus, libxml2 SAX is expected to be extremely fast. The results are shown in FIG. 5.

Figure 5:
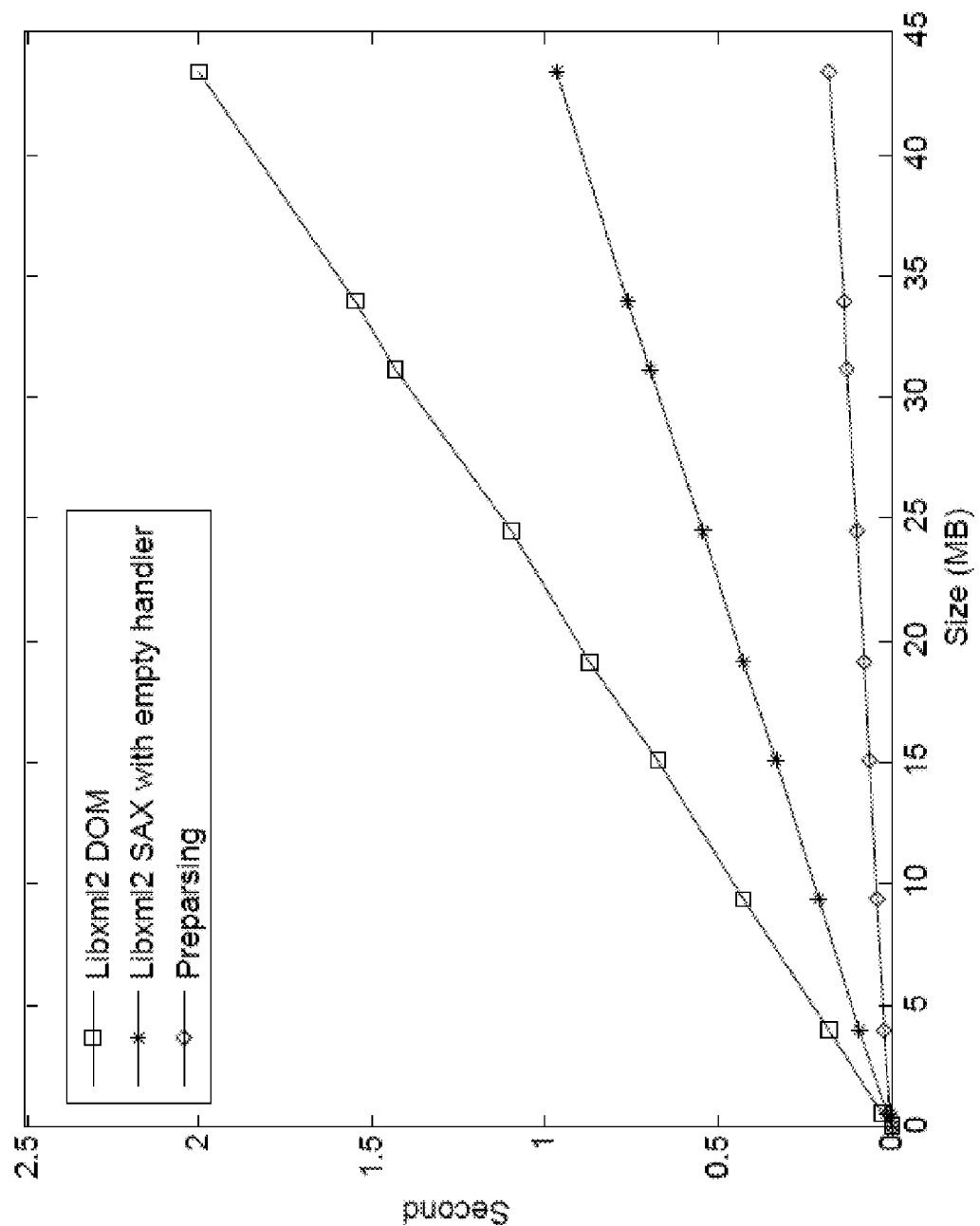
FIG. 5 shows a graph of a performance comparison of preparsing.

According to FIG. 5, it can be sees that preparsing is nearly 12 times faster than sequential parsing with libxml2 to build DOM. Even for libxml2 SAX parsing, preparsing is over 6 times faster. Even though the preparser builds a tree, the tree is simple and does not require expensive memory management. These results show that even the preparsing does not occupy much time, and the time left for actual parallel parsing is enough to result in significant speedup.

Speedup measures how well a parallel algorithm scales, and is important for evaluating the efficiency of parallel algorithms. It is calculated by dividing the sequential time by the parallel time. For these experiments, the sequential time refers to the time needed by libxml2 xmlParseInNodeContext( ) to parse the whole XML document. To be consistent, static PXP, dynamic PXP, and the sequential program are all configured to use the thread-optimized memory allocator. Each program is run five times and the timing result of the first time is discarded to warm the cache.

The upper bound of the speedup that the PXP algorithms could achieve is first measured. To do that, a big XML document is used in the previous preparsing experiment is selected as the parsing test document. The array in the XML document has around 50,000 elements and every element includes up to 28 attributes and the size of the file is 35 MB. Since the test document just contains a simple array structure, both static PXP and dynamic PXP algorithms may be applied on it.

Figure 6:
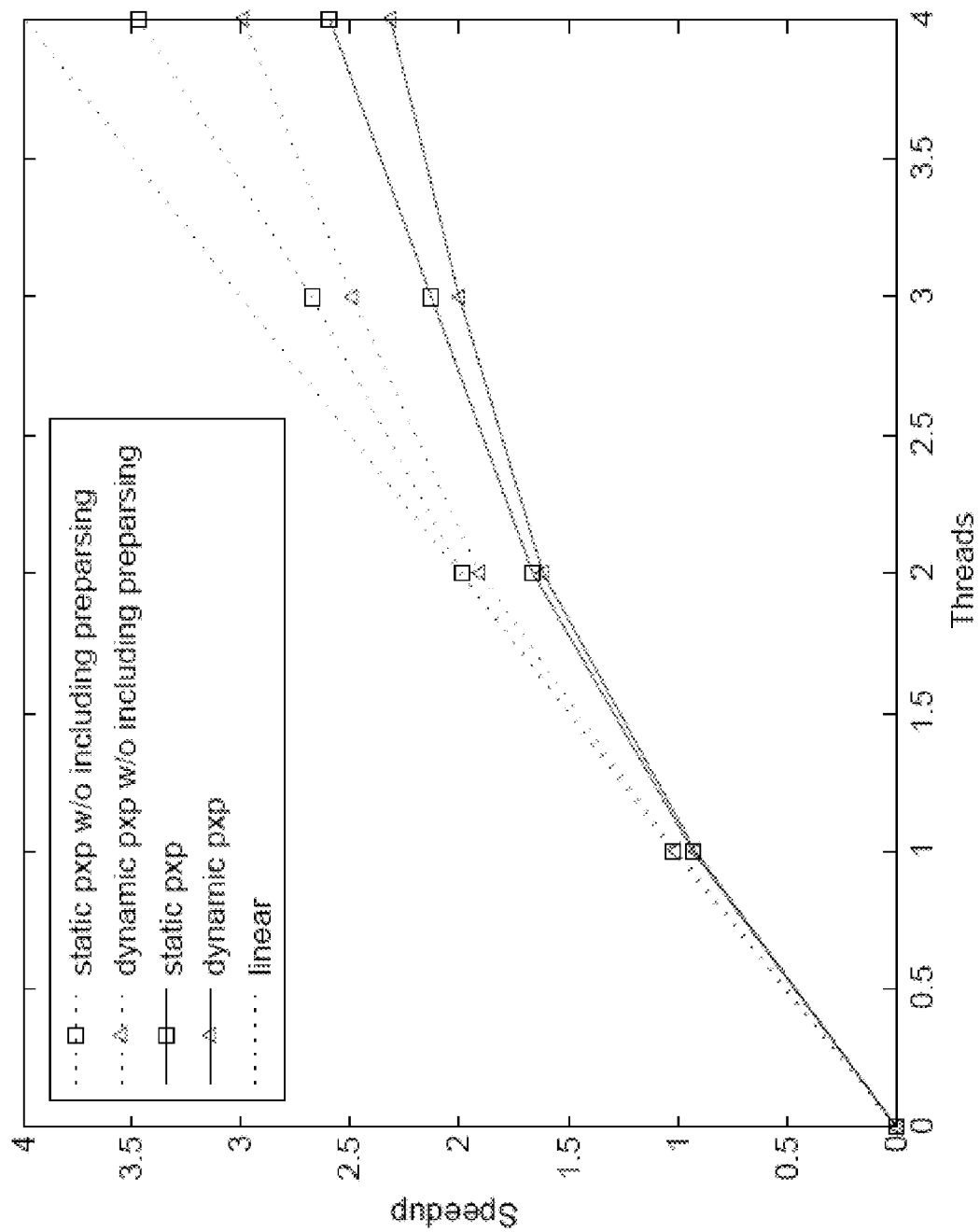
FIG. 6 shows a graph of the upper bound of the speedup of the parallel XML parsing algorithms for up to four threads, when used to parse a big XML document which only contains an array structure.

FIG. 6 shows how the static/dynamic PXP algorithms scales with the number of threads when parsing this test document. The diagonal dashed line shows the theoretical ideal speedup. From the graph it can be see that when the number of threads is one or two, the speedups of the PXP is sublinear, but if the preparsing time is subtracted from the total time the speedups of static PXP is close to linear. This indicates the preparsing dominates the overhead, and the static PXP presents the upper bound of the parallel performance.

The speedups of dynamic PXP are slightly lower than the ones of the static PXP, which indicates the cost of communication and synchronization starts to be a factor, but is relatively minor. When the number of threads is increased, the speedup of the PXP (dynamic or static) become less, because when the work load of every thread decreases, the overhead of the preparsing becomes more significant than before. Also, the dynamic PXP obtains less speedup than the static PXP due to the increasing communication cost. Furthermore, even the speedup of the static PXP, omitting the preparsing cost, starts to drop away from the theoretical limit. This may be because of shared memory or cache conflicts.

Unlike the static PXP, dynamic PXP is able to parse the XML documents with any tree shape. So to further study the performance improvement of dynamic PXP, the previous XML document was modified such that the big array structure assumed an irregular tree shape, which consists of a five top-level elements under the root, each with a randomly chosen number of children. Each of these children is an element from the array of the first test, and so the total number of these child elements in the modified document is same as the one of the original document.

Figure 7:
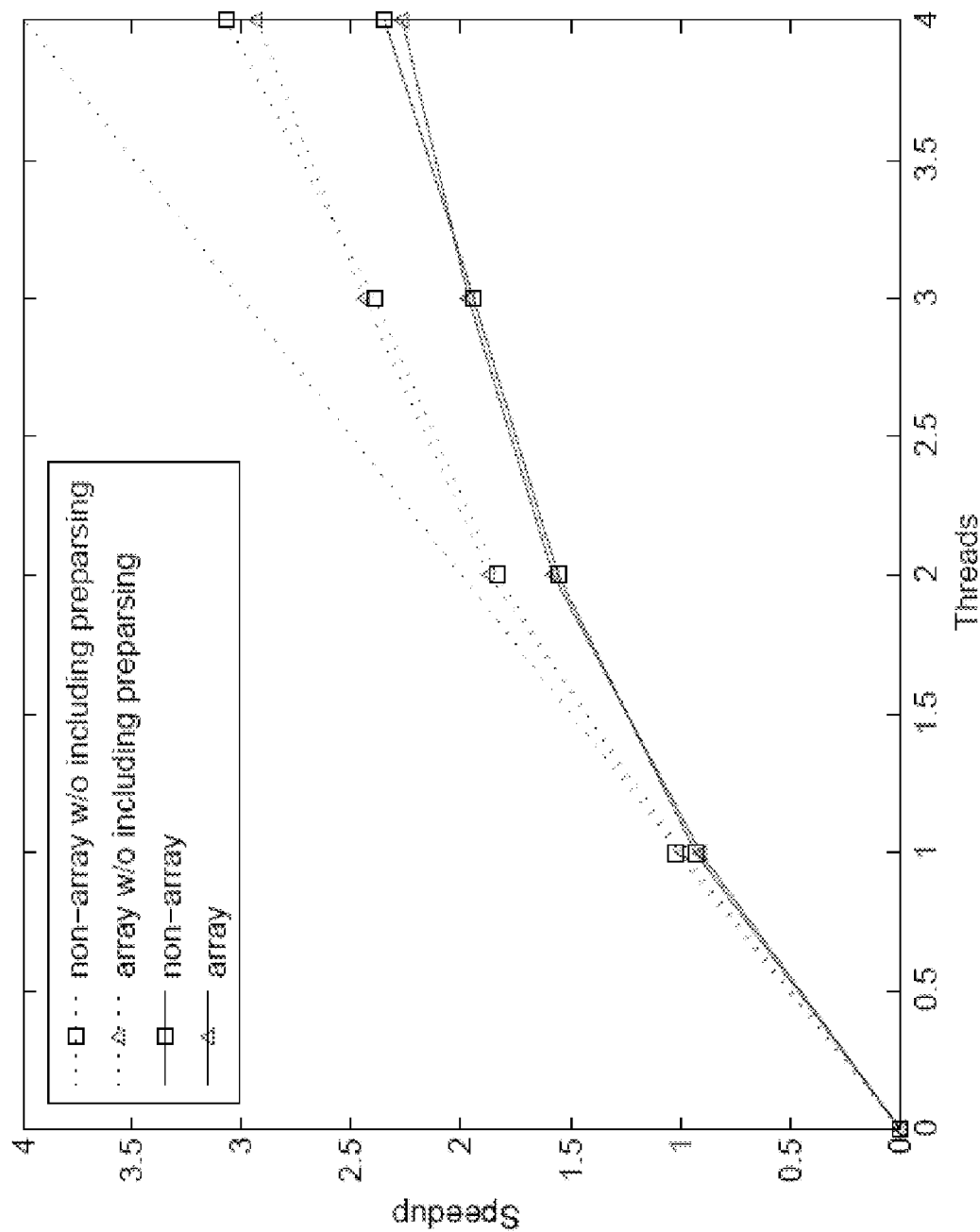
FIG. 7 shows a graph of the speedup of the dynamic parallel XML parser for up to four threads, when used to parse two same-size XML documents, one with irregular tree shape and one with regular array shape.
Figure 8:
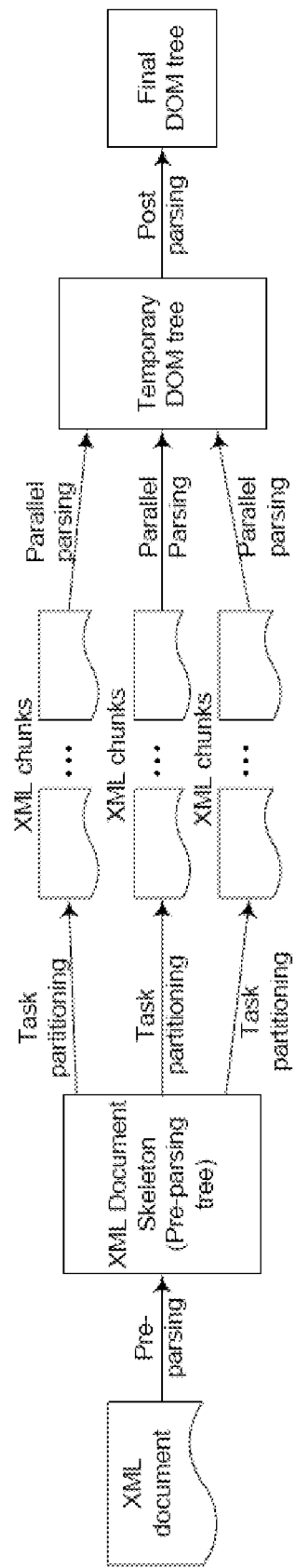
FIG. 8 shows the PXP architecture first uses a preparser to generate a skeleton of the XML document. The document is then partitioned into chunks, and each task assigned to a thread. After the parallel parsing is complete, the document is postprocessed to remove temporary nodes.
Figure 9A:
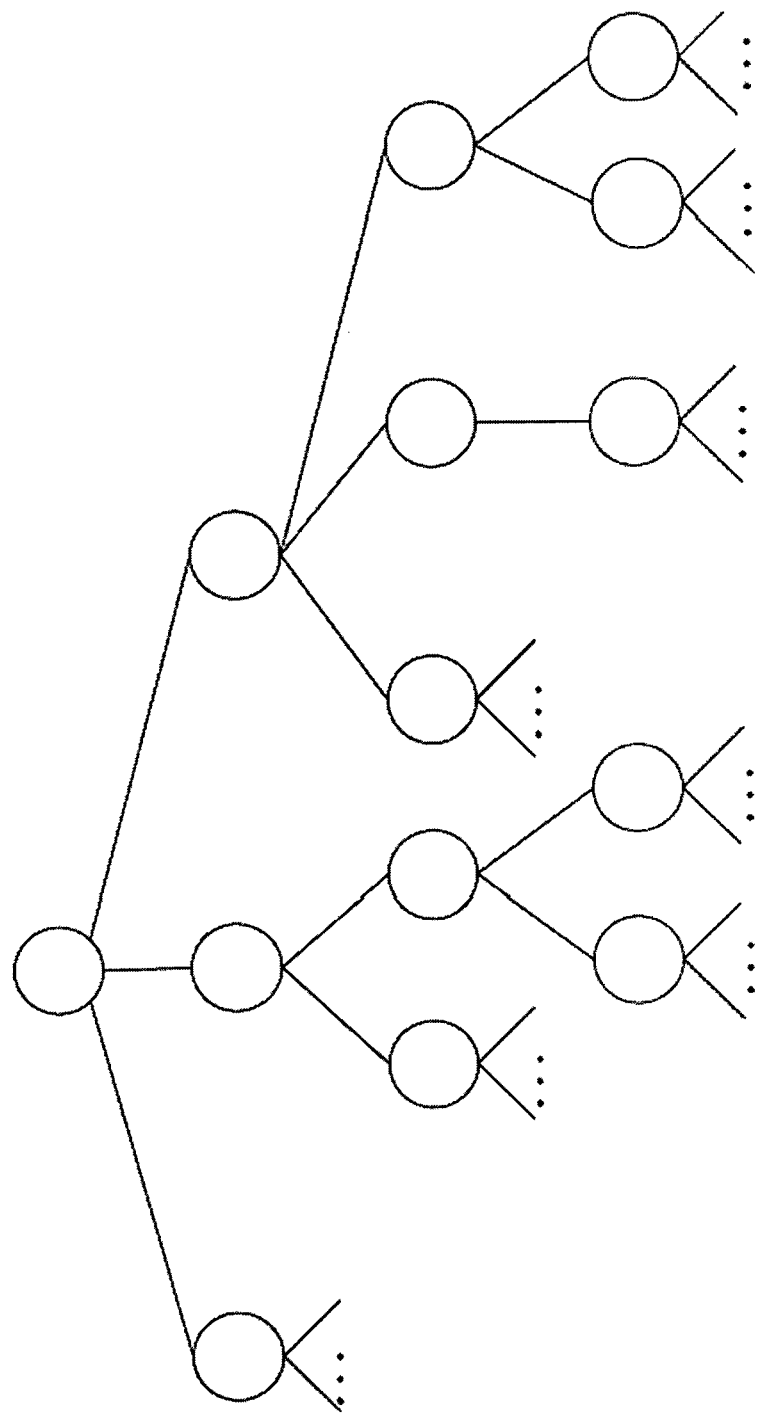
Figure 9B:
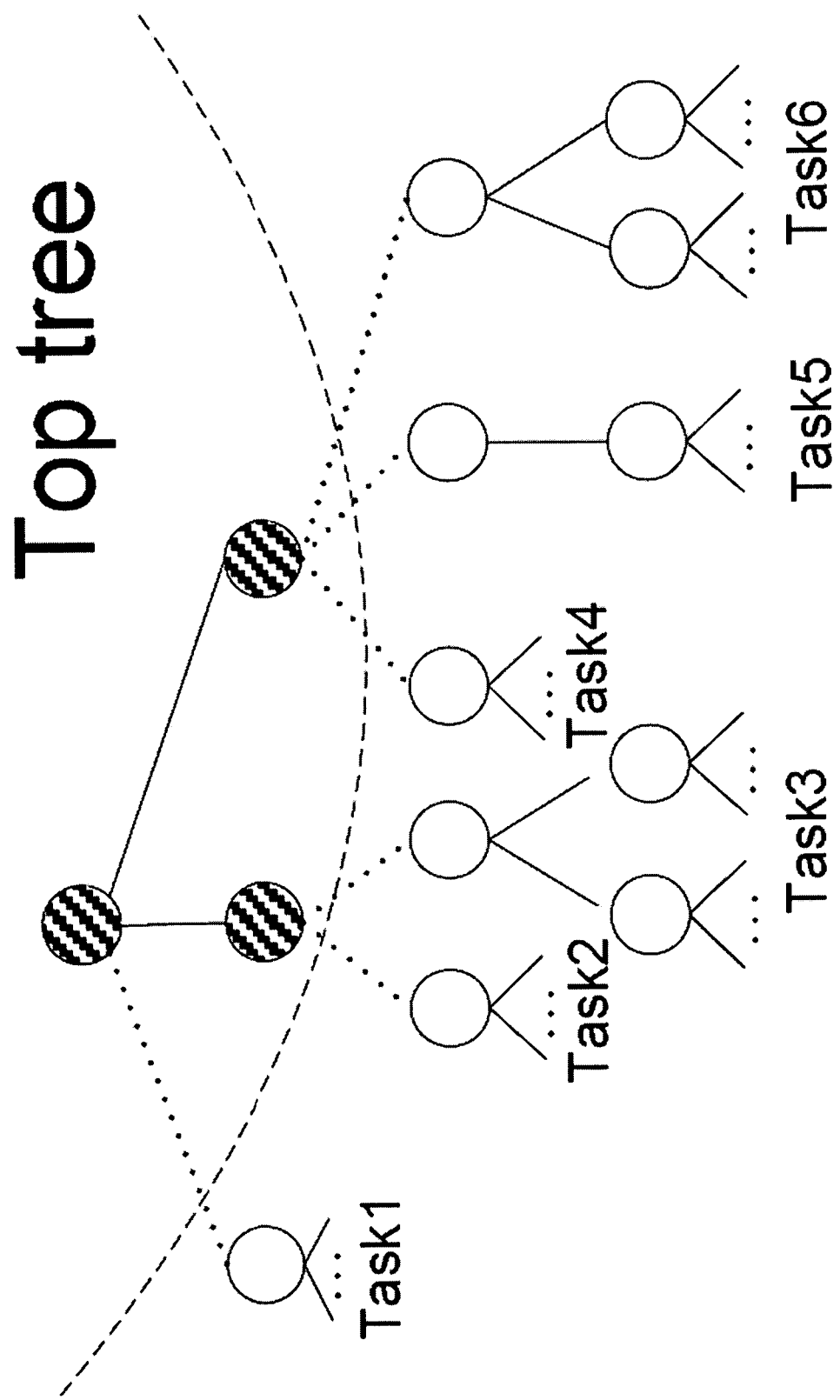
Figure 10:
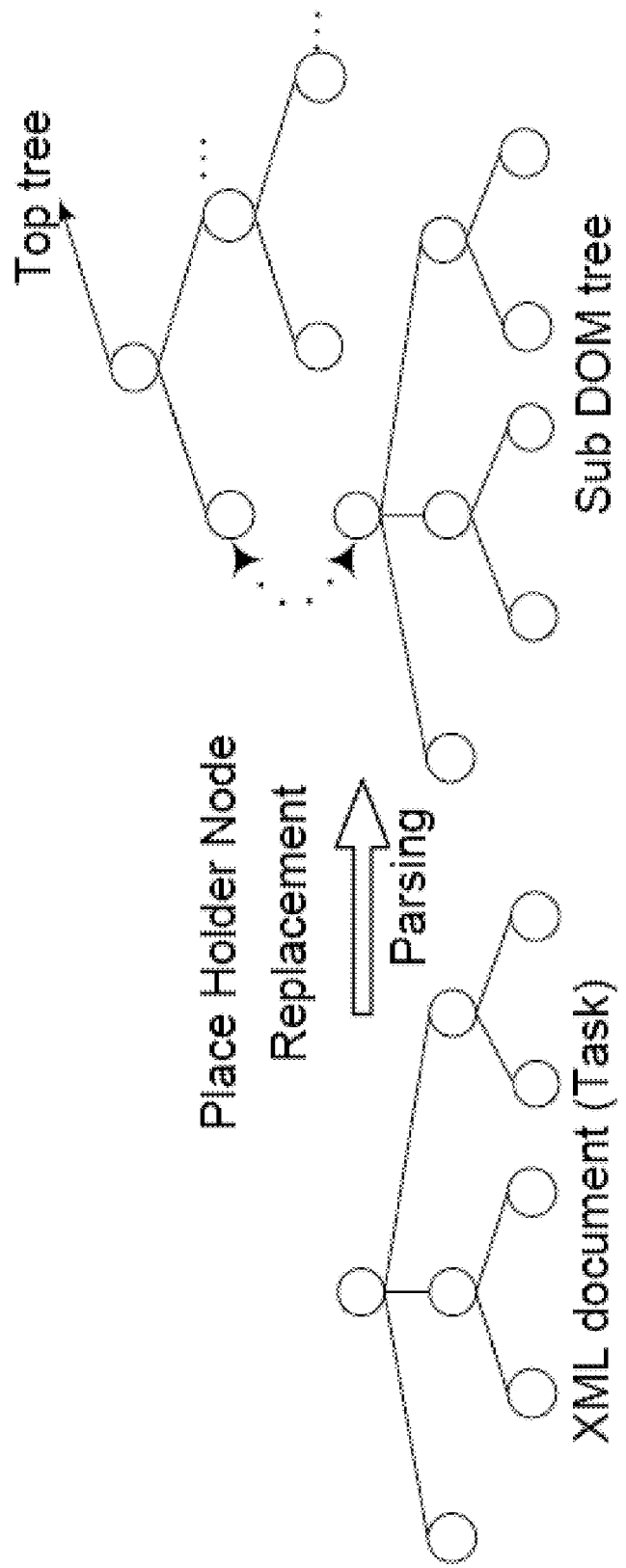
FIG. 10 shows subtree attached to the top tree, by replacing the placeholder node in-place, after the subtree is parsed.
Figure 11:
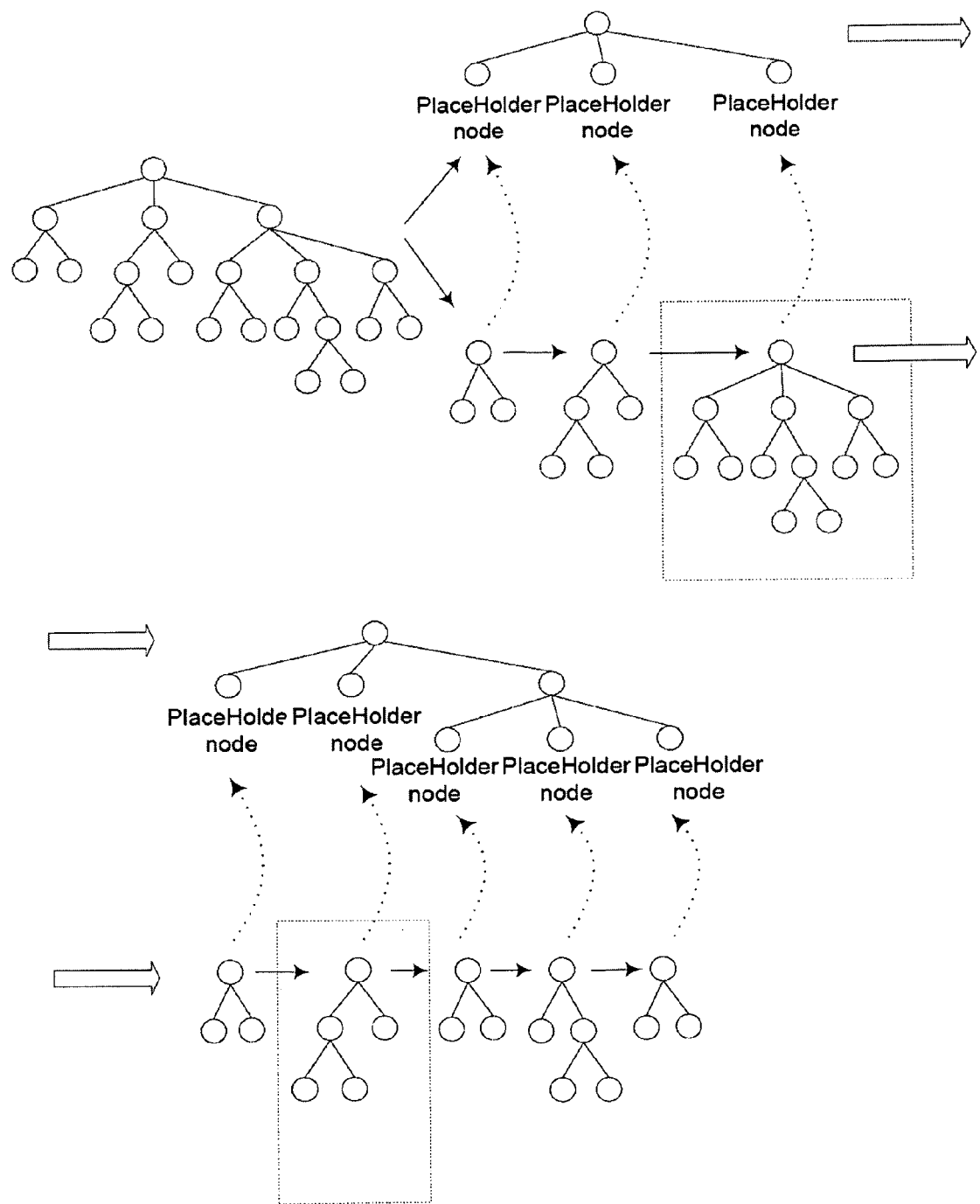
FIG. 11 shows that as the parsing proceeds, the top tree is grown downwards. As each subtree is processed, its root node is parsed and moved to the top tree by an in-place replacement of the corresponding placeholder node, and additional placeholder nodes are created. At each iteration, the largest remaining subtree is chosen for processing.

The dynamic PXP on this modified XML document is compared against the dynamic PXP on the original array XML document. This comparison shows how the dynamic PXP scales for the XML documents with irregular shape or regular shape. From the results shown in FIG. 7, it can be seen that there is little difference between two XML documents, which imply that dynamic PXP (and the task partitioning of dividing the remaining work in half) is able to effectively handle the large XML file with an irregular shape.

These tests did not actually further parse the element contents. In a typed parsing scenario, where schema or other information can be used to interpret the element content, even better scalability would be obtained. For example, if a large array of doubles including the ASCII-to-double conversion are being parsed, each thread has an increased workload relative to the preparsing stage and other overheads, and thus speedup would be improved.

The parallel XML parsing system and method according to the present invention has been shown to performs well for up to four cores, and is not thereby limited. An efficient parallel XML parsing scheme needs an effective data decomposition method, which implies a better understanding of the tree structure of the XML document. Preparsing is designed to extract the minimal tree structure (i.e., skeleton) from the XML document as quickly as possible. Indeed, it is possible to communicate the preparsed data with the XML document (analogous to an index), which can be created at its source, or at an intermediate location, which is then provided as metadata which accompanies the XML document, which eliminates the preparsing inefficiency entirely, while only increasing the size of the XML document by a small amount, and imposing only a small burden on the author of the XML document. For example, the preparse information could be generated in an XML validator, which may be executed as a matter of course before the XML document is initially released.

The key to the high performance of the preparsing is its highly simplified syntax as well as the obviation of full well-formedness constraints checking. Aided by the skeleton, the algorithm can partition the XML document into chunks and parse them in parallel.

Depending upon when the document is partitioned, the static PXP and dynamic PXP algorithms are employed. The former is only for the XML documents with array structures and can give the best case benefit of parallelism, while the latter is applicable to any structures, but with some communication and synchronization cost. The experiments show the preparsing is much faster than full XML parsing (either SAX or DOM), and based on it the parallel parsing algorithms can speedup the parsing and DOM building significantly and scales well.

Since the preparsing becomes the bottleneck as the number of threads increase, it may also be possible to parallelize that task, for further speedup.

Example 2

Experiments were run on a Sun Fire T1000 machine, with 6 cores and 24 hardware threads (CMT). Most large XML documents, particularly in scientific applications, are relatively broad rather than deep, also they typically contain one or two large arrays and the structure tends to be shallow. Hence a large XML file was selected for analysis containing molecular information representing the typical structural shape of XML documents in scientific applications. This was based on XML documents obtained from the Protein Data Bank [19]. It consists of two large arrays representing the molecule data as well as a couple elements for the molecule attributes. To obtain the different sizes, the molecule data part of the documents were repeated.

Every test was run ten times to get the average time and the measurement of the first time is discarded, so as to measure performance with the file data already cached, rather than being read from disk. The programs are compiled by Sun Workshop 5.2 CC with the option -O, and version 2.6.16 libxml2 library was used.

Tests employing straight libxml2 (without parallelization) also employ the special allocator designed for use with the parallelization scheme, since the results of straight libxml2 are better with this allocator than without it, and this provides a more consistent basis for comparison. The special allocator is intended simply to avoid lock contention, since the focus of the experiment is on the parsing itself.

Figure 13:
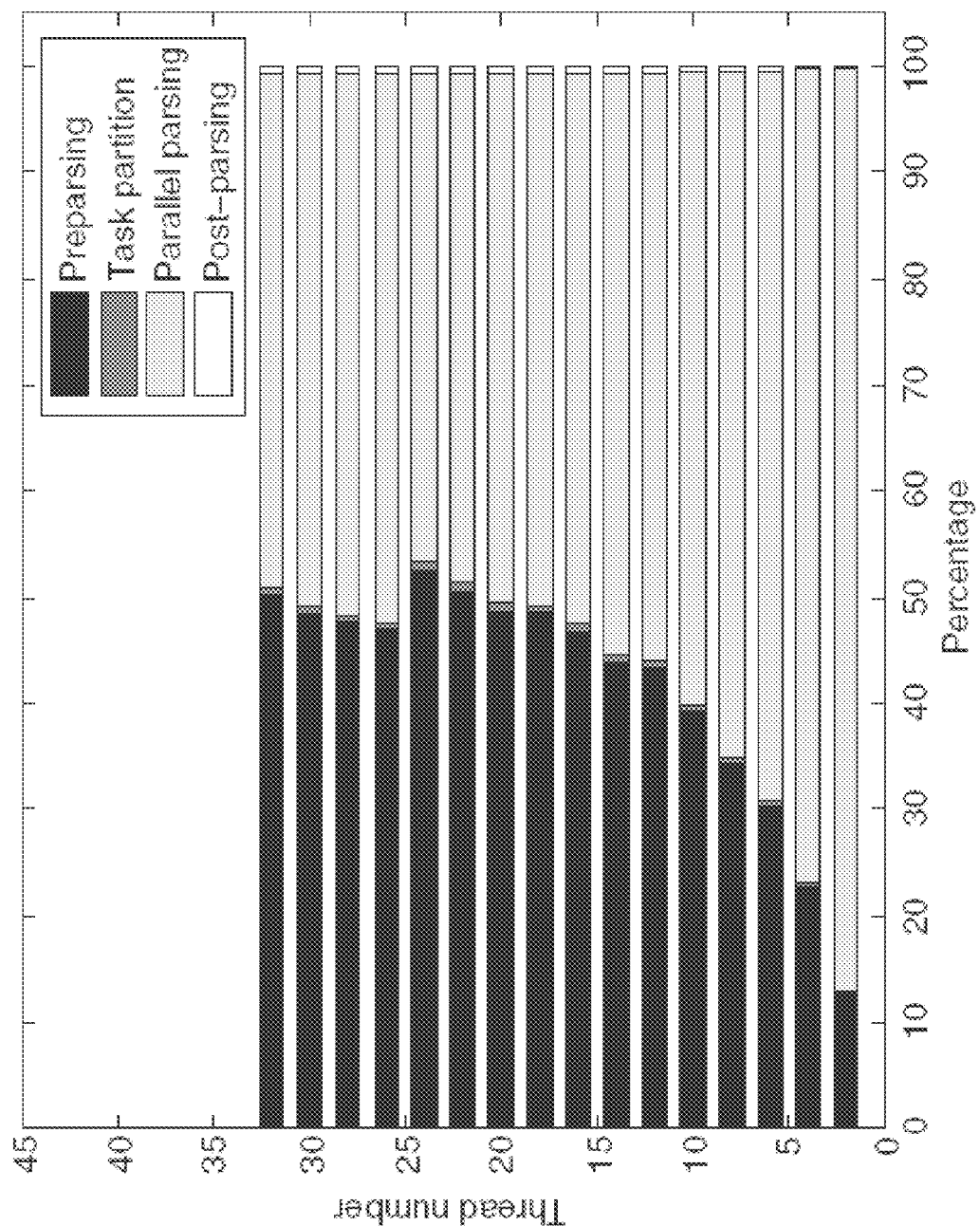
FIG. 13 shows performance breakdowns.

The implementation according to an embodiment of the current invention performs the stages as described herein, and thus the time for processing of each stage can be measured. The sequential stages include preparsing, task partitioning, and post-parsing, and the parallel stages comprise the parallel parsing, which is done by all the threads in parallel. The performance breakdown experiment is done on the aforementioned test XML document sized to 18 M bytes. The result is shown on FIG. 13, in which the different levels represents the percentage of the running time of each stage. Between 2 and 32 threads were tested, but only even numbered results are shown on FIG. 13 for clarity.

The most immediate feature to note is that the preparsing is by far the most time consuming part of the sequential stage, and the static partitioning stage is not a significant limit to the parallelism.

As a general trend up to 24 threads, the percentage of tome spent on the preparsing stage grows from 13% to 53%. Percentage on task partitioning grows from 0.17% to 0.71%. Percentage on post-processing grows from 0.16% to 0.73%.

This means that as the number of threads increase, the sequential stages consume an increasing percentage of the total time, and obviously can cause the performance to degrade.

Meanwhile, the time cost of the parallel parsing stages drops from 87% to 46%. When the participating threads reach more than 24, additional hardware threads are no longer available, thus requiring the OS to start context switching threads. This causes the percentage of parallel parsing to increase suddenly from 24 threads' 46% to 26 threads' 52%, and then minor reduction at each increased measurement results until 32 threads' 48%. As the number of threads increase, the post-processing stages increase from 2 threads' 0.16% to 32 threads' 0.74%.

Figure 14:
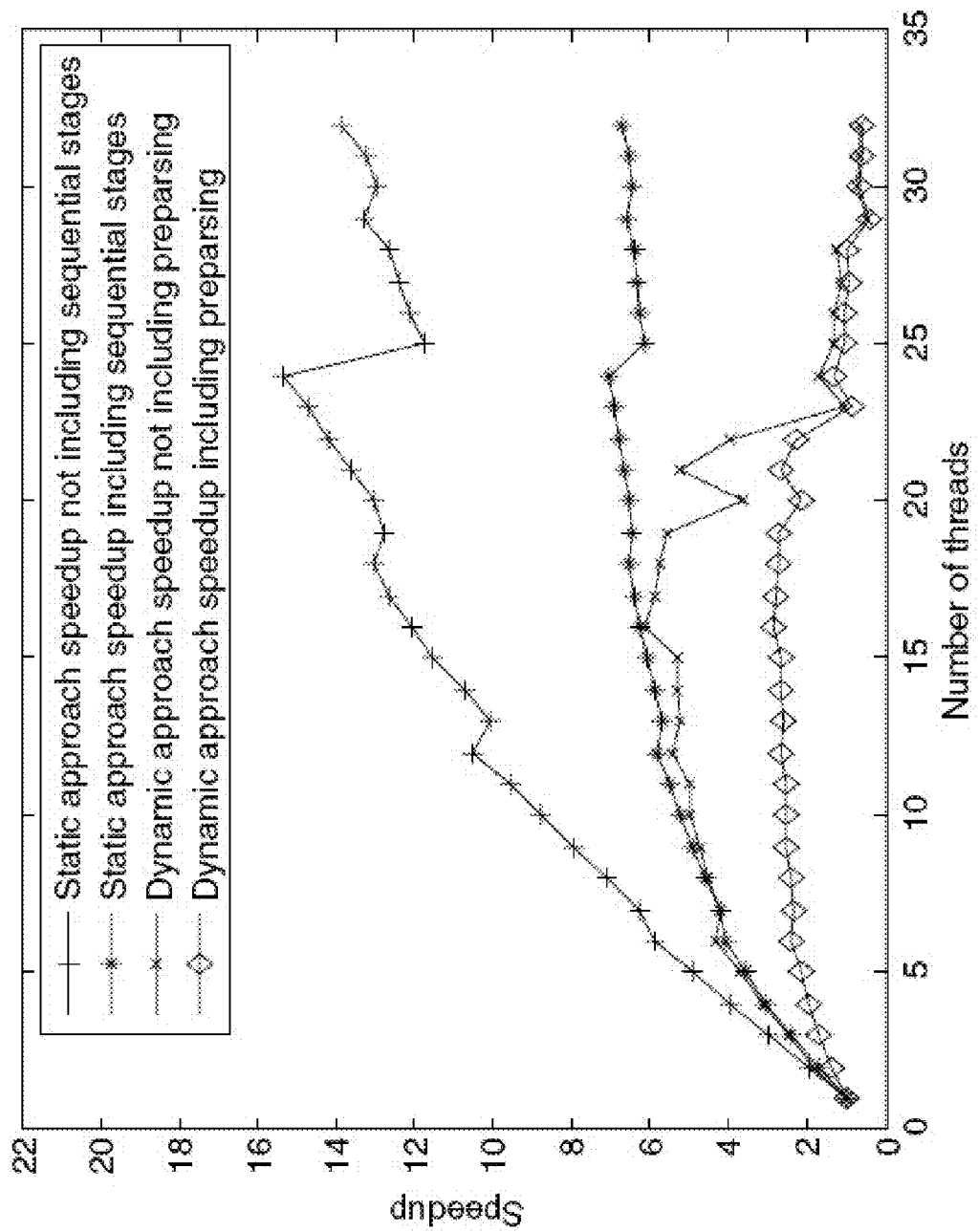
FIG. 14 shows a sSpeedup graph from 2 to 32 threads.

To show the benefit of the static approach on these kind of shallow structured XML documents, the static approach is compared with a dynamic approach as discussed above. Referring to FIG. 14, four types of measurement were conducted on both the static parallel parsing approach and dynamic parallel parsing approach. The tests were conducted on the test XML document sized to 18 M bytes, and to better explore the cause of performance limitations on each approach, two graph lines are provided: one is the total speedup and the other is the speedup not counting the sequential stages. Speedup in this case is computed against the time obtained by a pure libxml2 parse without any preparsing or other steps only needed for PXP.

Figure 15:
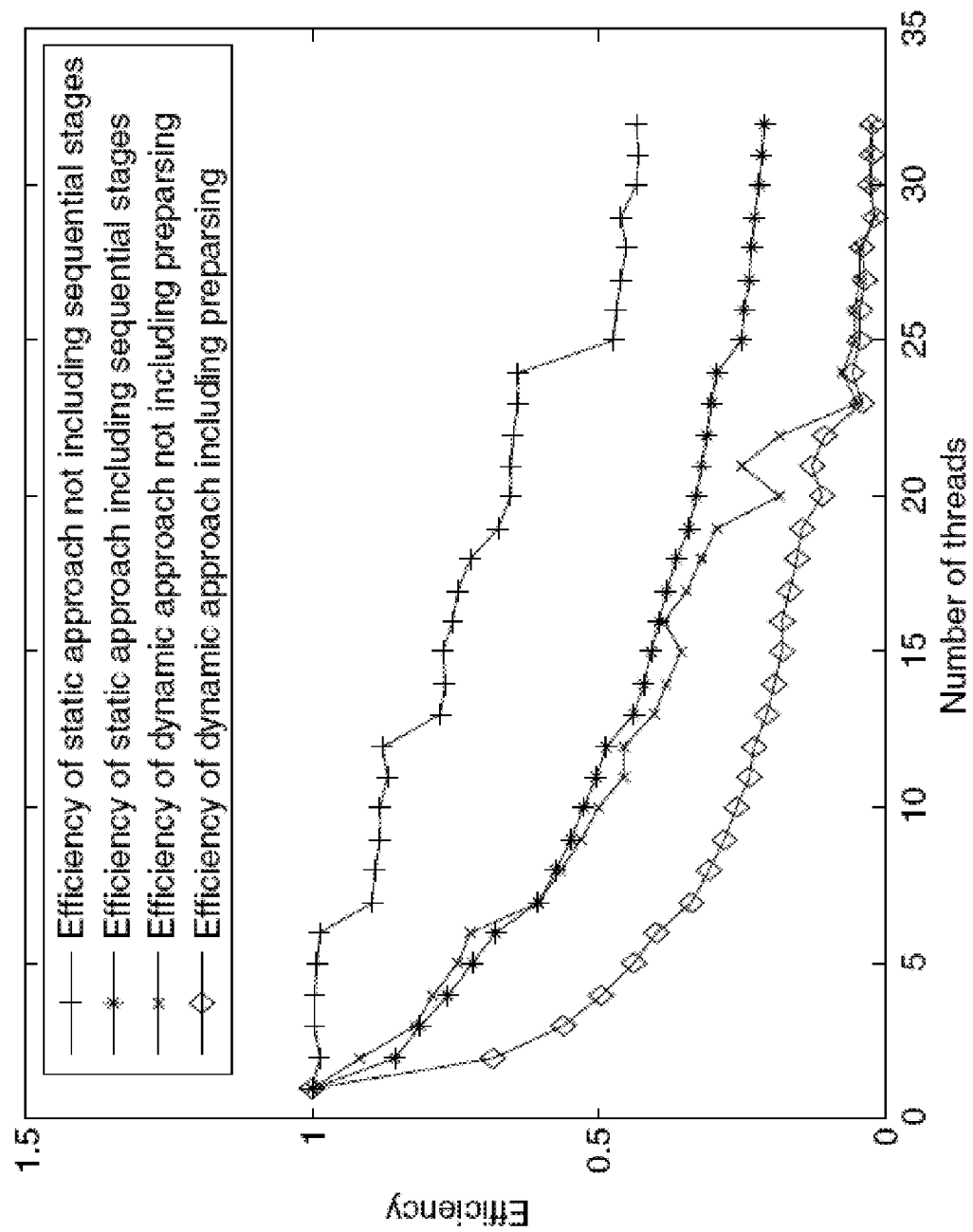
FIG. 15 shows an efficiency graph from 2 to 32 threads.

For the static approach, the sequential stages include preparsing, task partitioning and assignment, postprocessing; and for the dynamic approach, the sequential stages include just preparsing. It appears that every six threads, the speedup will have a distinct drop. This is due to the fact that there are only six cores on the machine. Every six threads, the number of hardware threads per core must increase. To better see the speedup degradation pattern, the efficiency graph as shown in FIG. 15 was generated. The efficiency is defined as the speedup divided by the number of threads. With the efficiency graph, the performance degradation can then be clearly seen.

Since the dynamic load-balancing is obtained by runtime work load stealing, which incurs intensive communication and synchronization cost with an increasing number of threads, it is not scalable to the number of cores, as FIG. 14 shows. Without preparsing, it reaches the maximum speedup with 16 threads, which is 6.1. After that point, it drops to the lowest value of 0.47 at 29 threads and continues to below one time speedup with the increase of the threads number. And for efficiency, the dynamic approach also dropped to 0.02 in the 32 threads case. These two figures show that though the dynamic approach has proved to be more flexible and suitable for parallel XML parsing on complex XML documents, for large XML documents with a simple array-like structure, as commonly seen in many types of XML documents, the static approach is more scalable than the dynamic approach.

Note that although more sophisticated dynamic load-balancing technologies exist to improve the scalability, for those shallow structured documents the static scheme should be hard to challenge. To better understand the pros and cons between the static approach and the dynamic approach, tests were also performed on complex structured XML. A deep and irregular structured XML document was generated with the size of 19 M bytes.

Figure 16:
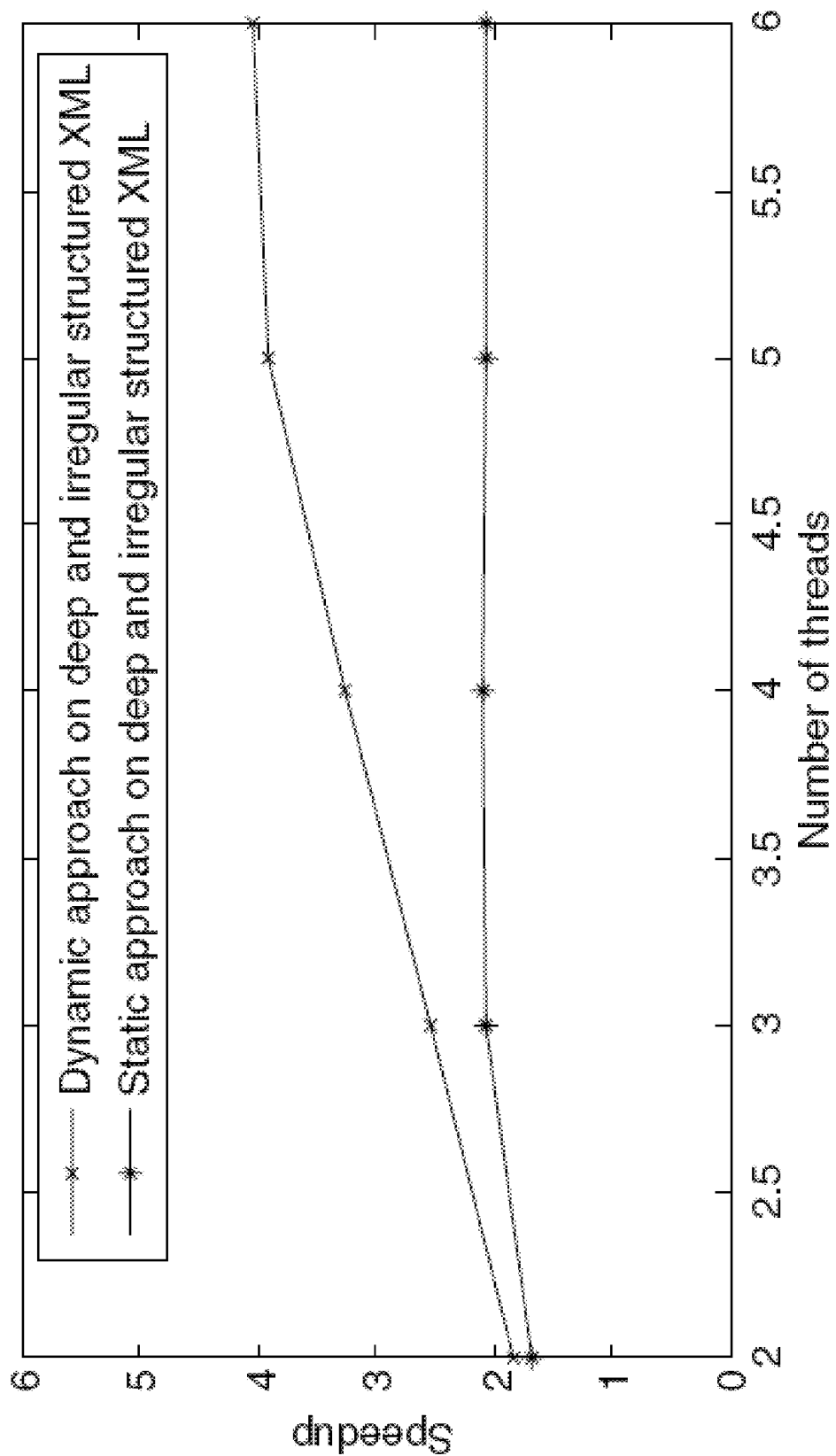
FIG. 16 shows that speedup not including sequential stages on the complex XML document.
Figure 17:
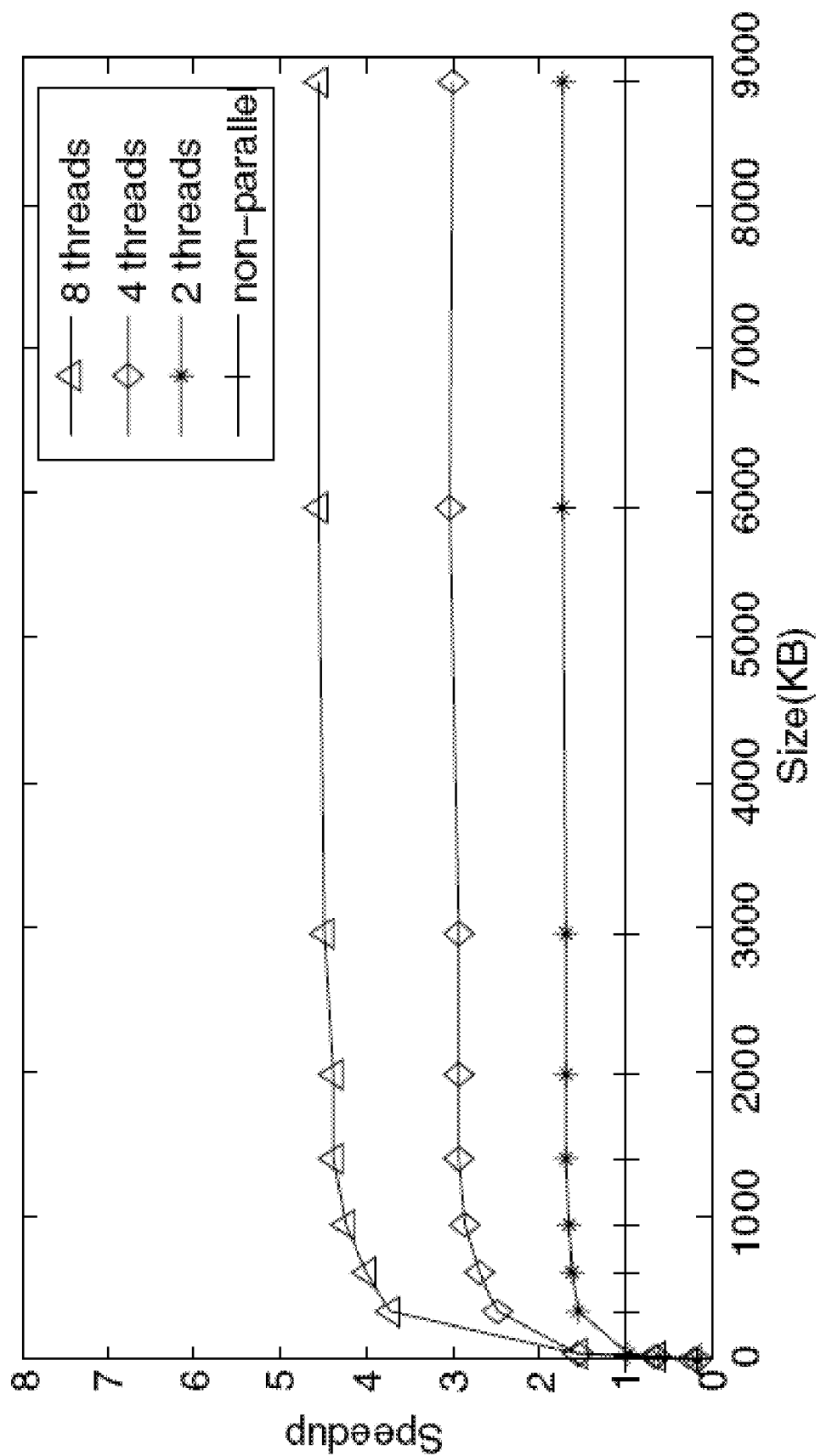
FIG. 17 shows Speedup with various sized simple.xml.

The tests results are shown in FIG. 16, however, indicate that in such case the speedup of static approach is much worse than the dynamic approach. The reason is that for complex XML documents it is harder to statically achieve a balanced load. Thus, with the number of threads increased, load imbalance becomes more serious. In addition, the near-linear speedup of the parallel parsing when not including the sequential portion means that significant improvements may be made in speed by targeting preparsing, which has been shown by the performance breakdown to account for the vast majority of the sequential time.

REFERENCES

[1] D. Veillard, "Libxml2 project web page," http://xmlsoft.org/, 2004.
[2] H. Sutter, "The free lunch is over: A fundamental turn toward concurrency in software," *Dr. Dobb's Journal*, vol. 30, 2005.
[3] W3C, "Xml information set (second edition)," www.w3.org/TR/xml-infoset/, 2003.
[4] J. E. Hopcroft, R. Motwani, and J. D. Ullman, *Introduction to Automata Theory, Languages, and Computation*. Addison Wesley, 2000.
[5] W3C, "Extensible Markup Language (XML) 1.0 (Third Edition)," www.w3.org/TR/2004/REC-xml-20040204/, 2004.
[6] G. Karypis and V. Kumar, "Parallel multilevel k-way partitioning scheme for irregular graphs," in *Supercomputing*, 1996.
[7] V. N. Rao and V. Kumar, "Parallel depth first search. part i. implementation," *Int. J. Parallel Program.*, vol. 16, no. 6, pp. 479-499, 1987.
[8] V. Kumar and V. N. Rao, "Parallel depth first search. part ii. analysis," *Int. J. Parallel Program.*, vol. 16, no. 6, pp. 501-519, 1987.
[9] A. Slominski, "Xml pull paring," www.xmlpull.org/, 2004.
[10] M. L. Noga, S. Schott, and W. Lowe, "Lazy xml processing," in *DocEng '02: Proceedings of the 2002 ACM symposium on Document engineering*, 2002.
[11] K. Chiu and W. Lu, "A compiler-based approach to schema-specific xml parsing," in *The First International Workshop on High Performance XML Processing*, 2004.
[12] W. M. Lowe, M. L. Noga, and T. S. Gaul, "Foundations of fast communication via xml," *Ann. Softw. Eng.*, vol. 13, no. 1-4, 2002.
[13] R. van Engelen, "Constructing finite state automata for high performance xml web services," in *Proceedings of the International Symposium on Web Services (ISWS)*, 2004.
[14] J. van Lunteren, J. Bostian, B. Carey, T. Engbersen, and C. Larsson, "Xml accelerator engine," in *The First International Workshop on High Performance XML Processing*, 2004.
[15] "Datapower," www.datapower.com/.
[16] A. Grama and V. Kumar. Parallel processing of combinatorial optimization problems. *ORSA Journal of Computing*, 1995.
[17] A. Y. Grama and V. Kumar. State of the art in parallel search techniques for discrete optimization problems. *IEEE Transactions on Knowledge and Data Engineering*, 11, 1999.
[18] V. Kumar, A. Y. Grama, and N. R. Vempaty. Scalable load balancing techniques for parallel computers. *J. Parallel Distrib. Comput.*, 22(1):60-79, 1994.
[19] V. N. Rao and V. Kumar. Parallel depth first search. part i. implementation. *Int. J. Parallel Program.*, 16(6):479-499, 1987.
[20] G. M. Amdahl. Validity of the single processor approach to achieving large scale computing capabilities. pages 483-485, 1967.

[21] [11] G. Karypis and V. Kumar. Parallel multilevel k-way partitioning scheme for irregular graphs. In *Supercomputing*, 1996.

APPENDIX

Structure of the XML document ns__att__test.xml

```
<xml xmlns:rs='urn:schemas-microsoft-com:rowset'
    xmlns:z='#RowsetSchema'
    xmlns:tb0='table0' xmlns:tb1='table1'
    xmlns:tb2='table2' xmlns:tb3='table3'>
    <z:row tb1:PRODUCT=... tb0:CCIDATE=...
        tb0:CLASS=... tb2:ADNUMBER=...
        tb0:PRODUCTIONCATEGORYID__FK=...
        tb3:ADVERTISERACCOUNT=...
        tb1:YPOSITION=... tb2:CHEIGHT=...
        tb2:CWIDTH=... tb2:MHEIGHT=...
        tb2:MWIDTH=... tb2:BHEIGHT=...
        tb2:BWIDTH=... tb3:SALESPERSONNUMBER=...
        tb3:SALESPERSONNAME=...
        tb1:PAGENAME=... tb1:PAGENUMBER=...
        tb2:BOOKEDCOLOURINFO=... tb1:EDITION=...
        tb1:MOUNTINGCOMMENT=... tb1:TSNLSALESSYSTEM=...
        tb1:TSNLCLASSID__FK=... tb1:TSNLSUBCLASS=...
        tb1:TSNLACTUALDEPTH=... tb1:XPOSITION=...
        tb0:TSNLCEESRECORDTYPEID__FK=...
        tb0:PRODUCTZONE=... ROWID=.../>
    <z:row ... />
    <z:row ... />
    ...
</xml>
```

What is claimed is:

1. A method of parsing a hierarchically organized data document, comprising the steps of: preparsing the data document to determine a logical tree structure;
   automatically dividing the data document into a plurality of sections, in dependence on the logical tree structure, each section comprising at least a beginning of a logical section of the logical tree structure, together with sufficient context; and
   automatically distributing the plurality of sections to a plurality of processors for concurrent parsing of the sections of the data structure,
   wherein a set of tasks is generated by iteratively removing a remaining branch of the logical tree structure which represents a largest task, and elevating the root of the subtree represented by the largest task to a next higher level, wherein a sufficient number of tasks is generated to permit efficient balancing.

2. The method according to claim 1, wherein the data document comprises an extensible markup language document.

3. The method according to claim 1, wherein the data document comprises the logical tree structure having a set of tags intermixed with a set of content data.

4. The method according to claim 1, wherein the hierarchically organized data document comprises data elements having an inferred logical relationship revealed by said preparsing.

5. The method according to claim 1, wherein each section is defined to have no interdependence with another section which precludes separate processing thereof.

6. The method according to claim 1, wherein each of the plurality of sections comprises a plurality of tasks, and wherein said automatically dividing comprises dividing the plurality of sections in dependence on a number of tasks such that a processing time for the plurality of sections by plurality of processors is balanced.

7. A method of parsing a plurality of portions of a hierarchically organized data document in parallel, comprising:
   providing a hierarchical skeleton of the data document, the hierarchical skeleton representing a hierarchical arrangement of data document elements, wherein at least one node of the hierarchical skeleton has a plurality of subtrees;
   providing a plurality of processors, each processor executing in parallel;
   automatically allocating to the plurality of processors respective tasks, each task representing a parsing operation on an element of the data document selected in dependence on the hierarchical skeleton;
   generating a set of tasks by iteratively removing a remaining branch of the hierarchical skeleton which represents a largest task, and elevating the root of the subtree represented by the largest task to a next higher level, wherein a sufficient number of tasks is generated to permit efficient balancing, wherein an assignment of tasks to respective processors is balanced; and
   automatically generating a data structure or procedural function calls representing the parsed data structure elements.

8. The method according to claim 7, wherein the data structure or procedural function calls comprise a document object model tree.

9. The method according to claim 7, wherein the data document comprises an extensible markup language document.

10. The method according to claim 7, wherein the data document comprises the logical tree structure having a set of tags intermixed with a set of content data.

11. The method according to claim 7, wherein the hierarchical skeleton is generated by a preparsing process.

12. The method according to claim 11, wherein the hierarchically organized data document comprises data elements having an inferred logical relationship revealed by said preparsing.

13. The method according to claim 7, wherein each element is defined to have no interdependence with another element which precludes separate processing thereof.

14. The method according to claim 7, wherein a plurality of respective tasks within a portion of the data document are together allocated to a respective one of the plurality of processors.

15. The method according to claim 7, wherein said generating a data structure or procedural function calls comprises maintaining ordering, and eliminating race conditions by inserting placeholder nodes within an interim data structure, and thereafter removing the placeholder nodes when no longer required.

16. An apparatus adapted to parse a hierarchically organized data document, comprising:
   a preparser configured to determine a logical tree structure of the data document, for use by a plurality of parsing processors, each of the plurality of parsing processors being configured to receive at least one of a plurality of divided sections of the data document, in dependence on the logical tree structure, wherein each section comprises at least a beginning of a logical section of the logical tree structure, with sufficient context to resolve any ambiguities wherein a set of tasks is generated by iteratively removing a remaining branch of the hierarchical skeleton which represents a largest task, and elevating the root of the subtree represented by the largest task to a next higher level, wherein a sufficient number of tasks is generated to permit efficient balancing; and a distribution control configured to distribute the plurality of sections to respective ones of the plurality of parsing processors for parsing of the sections of the data document.

17. The apparatus according to claim 16, wherein the data document comprises an extensible markup language document.

18. The apparatus according to claim 16, wherein the data document comprises the logical tree structure having a set of tags intermixed with a set of content data.

19. The apparatus according to claim 16, wherein said preparser further comprises a data packet or digital data stream router.

20. The apparatus according to claim 16, wherein said preparser further comprises a data-dependent data distributor.

21. The apparatus according to claim 16, wherein said preparser resides in a communications network router.

22. The apparatus according to claim 21, wherein said communications network router targets portions of a data communication to network destinations in based on the preparser.

23. The apparatus according to claim 16, wherein the hierarchically organized data document comprises data elements having an inferred logical relationship revealed by said preparsing.

* * * * *